(12) United States Patent
Meisner et al.

(10) Patent No.: US 6,325,191 B1
(45) Date of Patent: Dec. 4, 2001

(54) HYDRODYNAMIC TORQUE CONVERTER

(75) Inventors: Marc Meisner; Stephan Maienschein, both of Bühl; Uwe Wagner, Sinzheim; Frank Uhlmann, Bühl, all of (DE); Wendy Boman; Thomas Heck, both of Wooster, OH (US)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/670,965

(22) Filed: Sep. 27, 2000

Related U.S. Application Data

(62) Division of application No. 09/284,315, filed as application No. PCT/DE98/02547 on Aug. 25, 1998, now Pat. No. 6,142,272.

(30) Foreign Application Priority Data

| | | |
|---|---|---|
| Aug. 26, 1997 | (DE) | 197 37 022 |
| Aug. 29, 1997 | (DE) | 197 37 782 |
| Sep. 12, 1997 | (DE) | 197 40 151 |
| Oct. 30, 1997 | (DE) | 197 47 924 |
| Jan. 22, 1998 | (DE) | 198 02 212 |

(51) Int. Cl.$^7$ ................................................. F16H 45/02
(52) U.S. Cl. ..................... 192/3.29; 192/3.3; 192/70.17; 192/212
(58) Field of Search ..................................... 192/3.29, 3.3, 192/70.17, 212; 464/66, 67, 68

(56) References Cited

U.S. PATENT DOCUMENTS

| | | | |
|---|---|---|---|
| 4,580,668 | * | 4/1986 | Pickard et al. ........................ 192/3.29 |
| 5,186,292 | * | 2/1993 | Hageman et al. ................... 192/3.28 |
| 5,337,867 | * | 8/1994 | Kirkwood ............................ 192/3.29 |
| 5,667,042 | * | 9/1997 | Olsen et al. ......................... 192/3.29 |
| 6,142,272 | * | 11/2000 | Meisner et al. ...................... 192/3.29 |

* cited by examiner

*Primary Examiner*—Richard M. Lorence
(74) *Attorney, Agent, or Firm*—Darby & Darby

(57) ABSTRACT

The invention relates to a hydrodynamic torque converter including a turbine wheel arranged inside of a housing, a torque converter lockup clutch, an axially mounted piston, a torsional vibration damper and a hub. The turbine wheel and the piston are rotationally fixed to the input component of the damper. The input component is connected to the hub by means of a connection provided with a circumferential backlash. The output component of the damper is connected to the hub without circumferential backlash.

57 Claims, 14 Drawing Sheets

Figure 1:
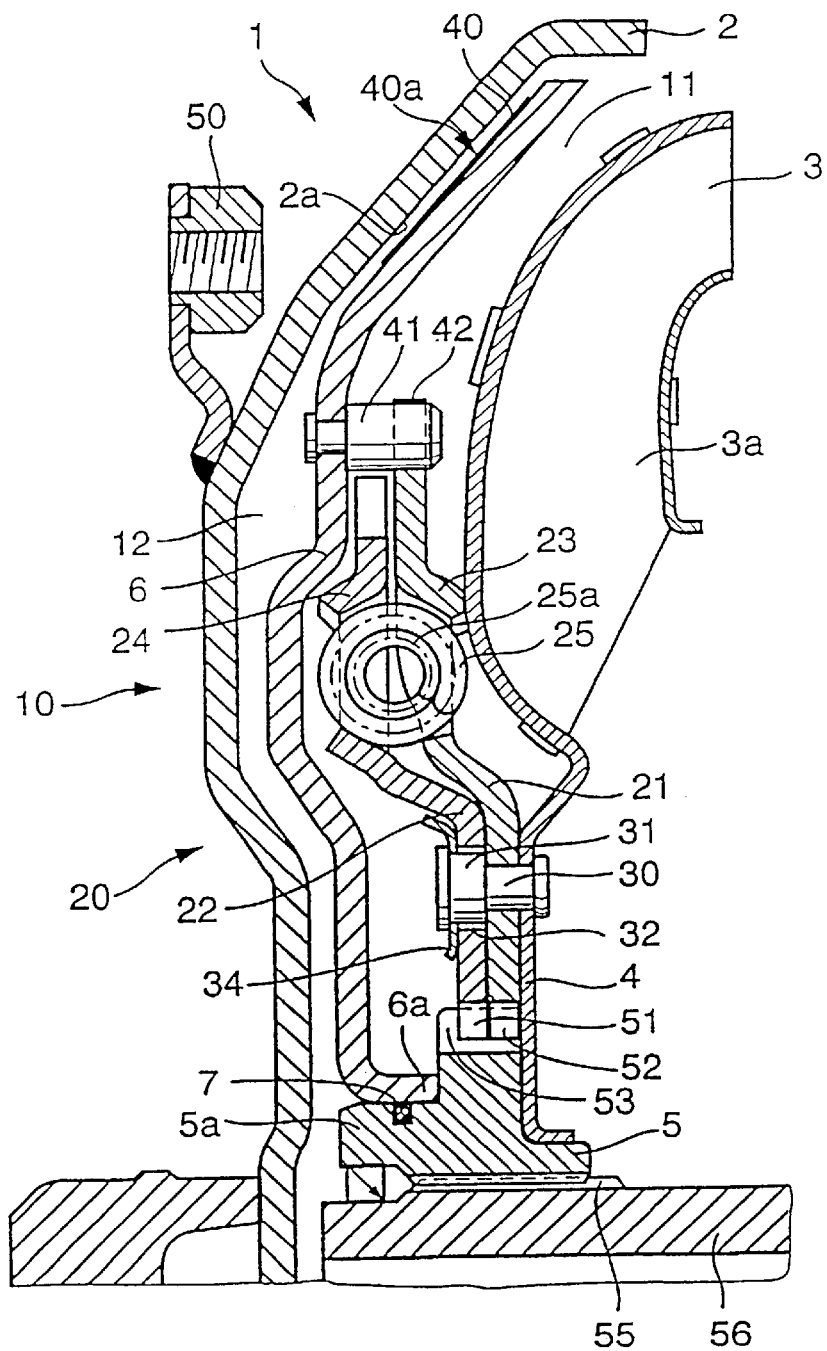

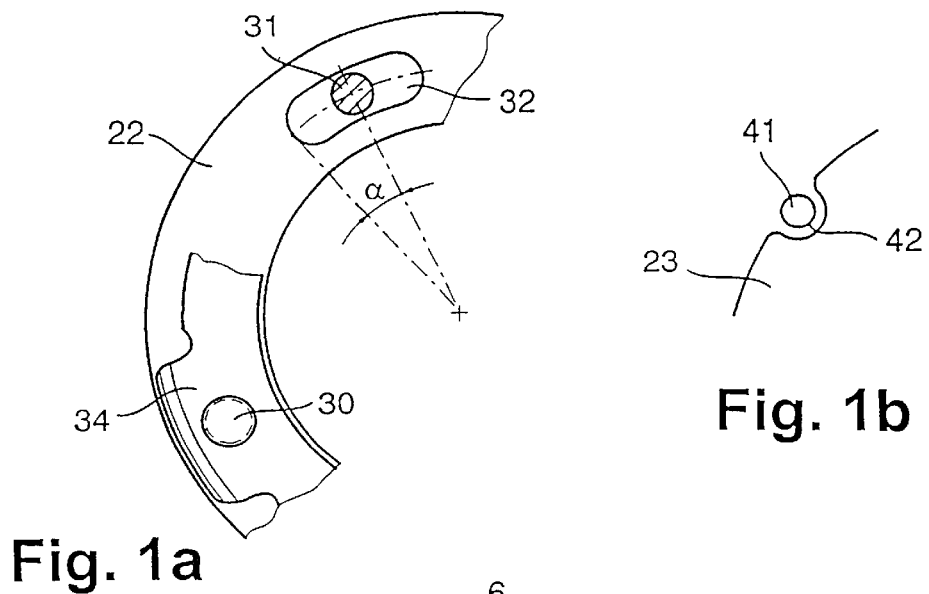
Fig. 1a
Fig. 1b
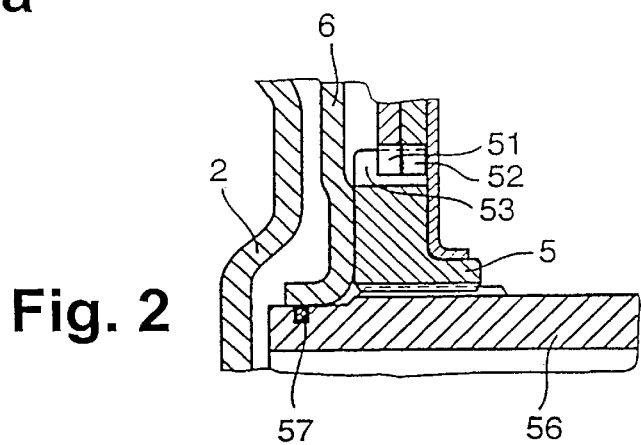
Fig. 2
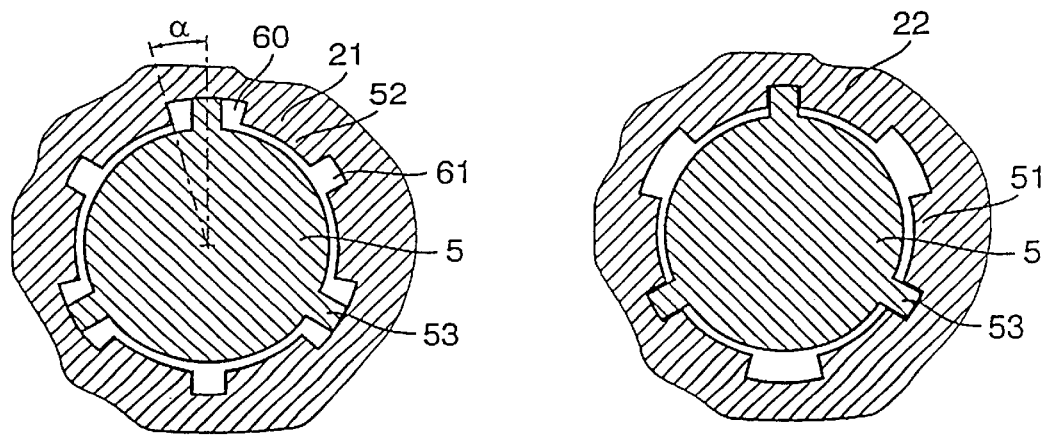
Fig. 3a
Fig. 3b

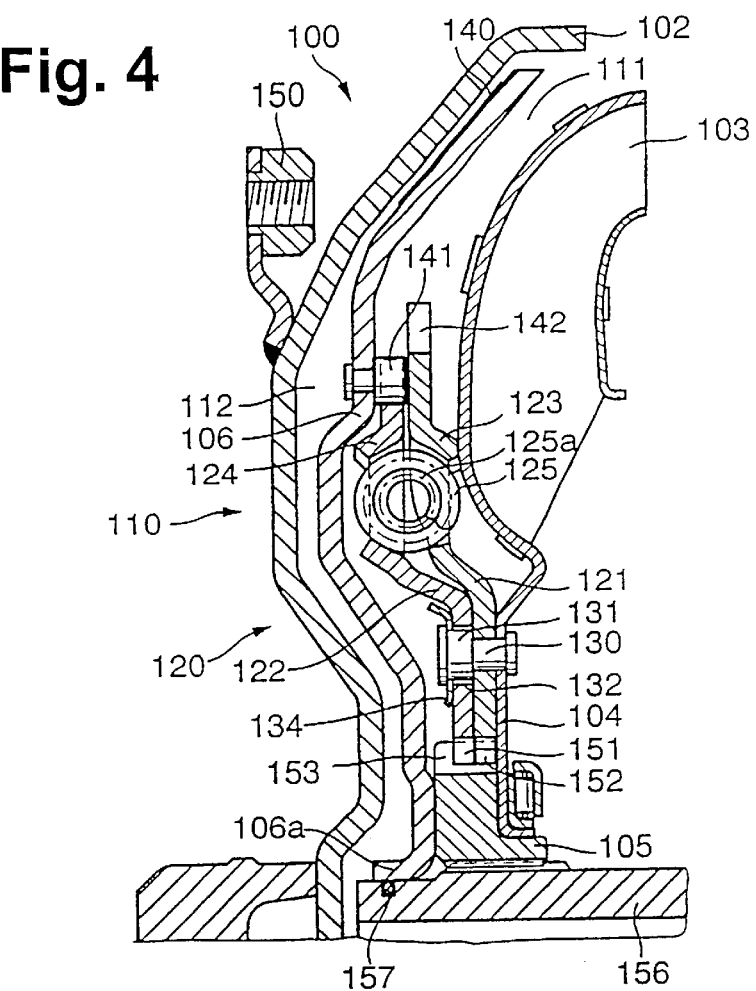
Fig. 4
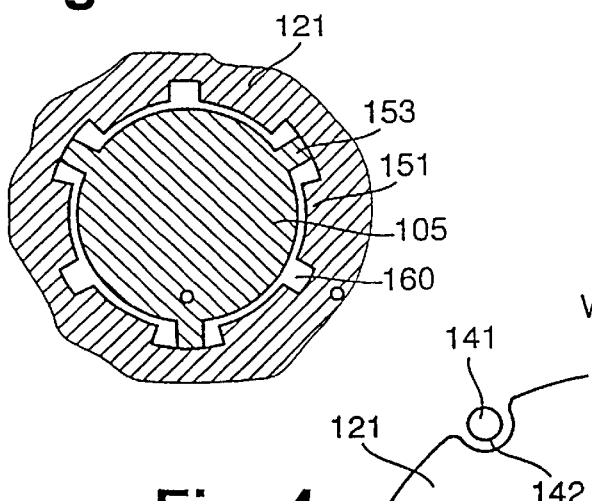
Fig. 4a
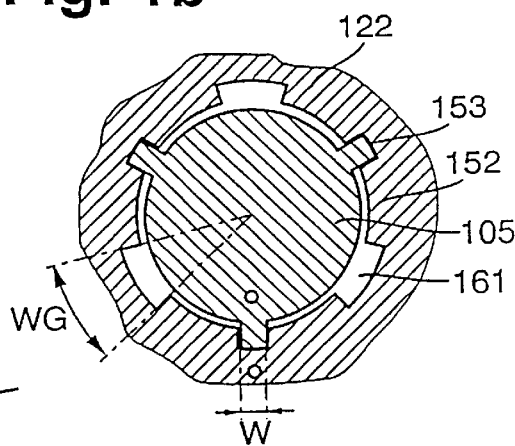
Fig. 4b
Fig. 4c

HYDRODYNAMIC TORQUE CONVERTER

CROSS REFERENCE TO RELATED APPLICATIONS

This application is a divisional of U.S. patent application Ser. No. 09/284,315, filed Jul. 1, 1999, now U.S. Pat. No. 6,142,272, which is a 371 / of PCT/DE98/02547 filed Aug. 25, 1998 which is hereby incorporated by reference in its entirety.

The invention relates to a hydrodynamic torque converter with a pump wheel received in a housing, a turbine wheel and, if necessary, a stator wheel, with a converter bypass clutch having an axially displaceable piston, and a torsional vibration damper having an input part and an output part which are turnable relative to each other at least against the restoring force of energy storing elements which are disposed between them, as well as with a hub.

Such hydrodynamic torque converters became known, for example, from DE-OS 195 14 411. In such prior art torque converters, the turbine wheel comprises its own hub which is connected, with play, to an output hub by way of a motion transmitting gearing. The output part of the damper is connected with the output hub by means of rivets. This entails pronounced expenditures for assembly and necessitates the utilization of an increased number of different parts.

It is an object of the invention to provide a hydrodynamic torque converter of the above outlined character which can be produced in a simple manner-and can be assembled by resorting to fewer parts and installed at a reduced cost, but the satisfactory operability of the torque converter should be preserved. Furthermore, it is an object of the invention to provide a hydrodynamic torque converter which is constructed in a space-saving manner, of particular interest being especially the axial space requirements in view of the continuously decreasing availability of space for installation in the axial direction of the motor vehicle transmissions.

In accordance with the invention, this is accomplished in that the turbine wheel and the piston are non-rotatably connected with the input part of the damper and the input part of the damper is secured to the hub by a connection which exhibits an angular play, the output part of the damper being secured to the hub by a connection which is devoid of angular play.

Owing to the novel undertaking, one can ensure that the utilized component parts of the torque converter, inclusive of the damper and the converter bypass clutch, are of a relatively simple design as well as that the overall number of parts is small.

Various advantageous embodiments and further modifications of the invention, as well as further developments of the inventive concept, are set forth in the additional claims.

It is particularly expedient if the hub is provided with external teeth and the input part of the damper is provided with internal teeth mating with the external teeth of the hub with angular play to thus establish a connection with angular play, and if the output part of the damper is provided with internal teeth mating with the external teeth of the hub without angular play to thus establish a connection which is devoid of angular play.

The object of the invention is further accomplished in that, in a hydrodynamic torque converter with a pump wheel received in a housing, a turbine wheel and, if necessary, a stator wheel, with a converter bypass clutch having an axially displaceable piston, and a torsional vibration damper having an input part and an output part which are turnable relative to each other at least against the restoring force of energy storing elements which are disposed between them, as well as with a hub, the piston is non-rotatably connected with the input part of the damper and the input part is secured to the hub by a connection which exhibits an angular play, the turbine wheel being non-rotatably connected with the output part of the damper and the output part of the damper being secured to the hub by a connection which is devoid of angular play.

It is particularly advantageous in such a torque converter if the hub is provided with external teeth and the input part of the damper is provided with internal teeth which mate, with angular play, with the external teeth of the hub to thus establish a connection with angular play, as well as if the output part of the damper is provided with internal teeth which mate, without angular play, with the external teeth of the hub to thus establish a connection which is devoid of angular play.

It is particularly advantageous if the turbine wheel comprises an annular radially inner portion which is non-rotatably connected with the input or output part of the damper, and the turbine wheel further comprises a section extending in the axial direction, while the hub comprises a section extending in the axial direction and the turbine wheel is journalled on the hub by means of sections extending in the axial direction. For example, the arrangement can be such that the turbine wheel has freedom of angular movement through a preselectable angle relative to the hub. The turbine wheel is preferably centered in a radial direction by being journalled on the hub.

It is desirable that the damper comprise at least two disc-shaped elements which are turnable relative to each other against the restoring force of energy storing elements which are installed between them, one of the disc-shaped elements constituting the input part of the damper and another of the disc-shaped elements constituting the output part of the damper, the disc-shaped elements being mounted on the hub in such a way that they are coaxial with each other.

In accordance with a further inventive concept, it is of advantage if the input part of the damper is connected to or made of one piece with at least one element which projects in the axial direction and extends into openings of the output part. Such element can constitute a rivet or a bent-over lug which forms part of the input part and extends in the axial direction.

It is of advantage in such embodiment if, by coming into abutment with the surfaces at the ends of openings in the output part, the at least one axially projecting element of the input part limits the extent of angular movability of the input and output parts relative to each other.

It is of advantage if the extent of angular movability of the input and output parts relative to each other, in view of abutment of the at least one axially projecting element against the surfaces at the ends of openings in the output part, exceeds the extent of angular movability of the input part and the hub relative to each other.

It is further of advantage if, by eliminating the angular play between the input part and the hub as a result of angular movement of the input and output parts relative to each other, torque is being transmitted from the input part to the hub prior to reaching a maximal angular displacement between the input and output parts as a result of abutment of the at least one axially extending element of the input part against the surfaces at the ends of openings in the output part.

It is equally of advantage if the at least one axially projecting element is connected to or made of one piece with the output part and extends into openings of the input part.

Furthermore, it is of advantage if the at least one axially projecting element of the input or output part constitutes a rivet element which is form-lockingly connected with the input or output part.

In a hydrodynamic torque converter according to the invention, it is desirable that the at least one axially projecting element of the input or output part constitute a lug which is of one piece with the input or output part and is obtained by displacing some material of the input or output part.

It is also of advantage if the rivet element connects the input part and the turbine wheel radially inwardly of the vanes of the turbine wheel.

It is also of advantage if the axially shiftable piston of the converter bypass clutch comprises at least one element which projects in the axial direction and extends into a receptacle of the input or output part to form-lockingly connect such part with the piston.

It is also of advantage if the at least one axially projecting element constitutes a rivet element which is connected with the piston or with the input or output part.

It is also of advantage if the at least one axially projecting element which is formed from the sheet metal of the piston, or of the input or output part, such as by deformation.

Furthermore, it is of advantage if the piston of the converter bypass clutch comprises an annular radially inner portion which is axially movably mounted on an extension of the hub.

Moreover, it is particularly advantageous if the piston of the converter bypass clutch comprises an annular radially inner portion which is axially movably mounted on the input shaft of the transmission.

It is desirable that the radially inner portion of the piston be centered in the radial direction.

In a hydrodynamic torque converter which embodies the inventive concept and includes a converter bypass clutch having a piston, at least one first friction surface and a second friction surface, it is of advantage that the first friction surface constitute the friction surface of a friction lining carried by the piston and cooperating with the second friction surface in the region of the housing, e.g., a wall of the housing.

In a hydrodynamic torque converter which embodies the inventive concept and includes a converter bypass clutch having a piston, a first friction surface and a second friction surface, it is of particular advantage if the piston carries the second friction surface cooperating with a first friction surface of a friction lining disposed in the region of the housing, such as a wall of the housing.

Furthermore, it is of advantage in a hydrodynamic torque converter including a converter bypass clutch having a piston, a friction surface and a complementary friction surface to provide between the piston and the complementary friction surface in the region of a wall of the housing a substantially circular ring-shaped element which, on the one hand, is non-rotatably connected with the piston and, on the other hand, is adapted to be force-lockingly urged by the piston in the axial direction and against that friction surface which is provided on the housing.

In such embodiment, it is of advantage if the piston comprises at least one force applying section by means of which the piston can apply force to the circular ring-shaped element.

It is equally of advantage if the force applying section of the piston constitutes a substantially circular ring-shaped section of the piston which projects axially beyond the immediately surrounding area.

Furthermore, it is of advantage if the force applying section of the piston is constituted by at least one substantially circular ring-shaped section of the piston which can be made by deforming the material of the piston, especially by stamping or embossing, and constitutes a bulge which projects axially beyond the immediately surrounding area.

It is of advantage if, in the region of the force applying section, the substantially circular ring-shaped element is connected with the piston, e.g., by riveting or welding or in a form-locking manner.

It is equally advantageous if the circular ring-shaped element is connected with the piston radially inwardly of the force applying section, e.g., by riveting or welding or in a form-locking manner.

Still further, it is of advantage if the circular ring-shaped element is connected with the piston radially outwardly of the force applying section, such as by riveting or welding or in a form-locking manner.

It is also of advantage if the circular ring-shaped element constitutes an element having an I-shaped cross-sectional outline with a first leg extending in the radial direction and a second leg extending in the axial direction.

It is of advantage if the axially extending second leg of the circular ring-shaped element is provided with teeth, such as projecting lugs, which extend, form-lockingly and non-rotatably, in the axial direction into engagement with or through complementary teeth, such as receiving portions, of the piston.

It is also advantageous if the circular ring-shaped element constitutes an element having an I-shaped cross-sectional outline and if the form-locking connection between the axially extending leg and the piston is located radially inwardly of the pressure applying section of the piston.

It is also advantageous if the circular ring-shaped element constitutes an element having an I-shaped cross-sectional outline and the form-locking connection between the axially extending leg and the piston is located radially outwardly of the pressure applying section of the piston.

It is also advantageous if the form-locking connection between the axially extending leg and the piston is designed to merely establish a rotation-preventing connection but does not transmit axial forces.

It is also advantageous if the circular ring-shaped element constitutes a plane or conical element and is provided with a friction surface at a side facing away from the piston.

It is also advantageous if the circular ring-shaped element constitutes a plane or conical element and constitutes a lining-carrying element supporting a friction lining with a friction surface at that side which faces away from the piston.

It is also advantageous to provide between the circular ring-shaped element and the piston a sealing element, such as an O-ring.

It is of advantage if the sealing element is disposed radially inwardly of a pressure applying section of the piston.

In accordance with a further development of the invention, it is also of advantage if the sealing element is disposed radially otwardly of the pressure applying section of the piston.

In accordance with a further development of the invention, it is of advantage if the sealing element is disposed radially between two pressure applying sections of the piston.

Furthermore, it is advisable that the sealing element be received in a circumferential groove of the piston or of the circular ring-shaped element.

It is advantageous to provide, between the friction surface of the housing wall and the friction surface of the circular ring-shaped element, a lamina having a leg which extends in a radial direction and has two sides each of which is provided with a friction surface.

It is also advisable that at least one side of the radially extending leg of the lamina carry a friction lining having a friction surface.

Furthermore, it is of advantage if the lamina comprises a leg which extends in the axial direction and has one or more teeth, such as a projecting lug, non-rotatably engaging complementary teeth, such as a receiving portion, of the input part of the damper.

Furthermore, it is advisable that the lamina comprise a leg which extends in the axial direction and has one or more teeth, such as a projecting lug, non-rotatably engaging complementary teeth, such as a receiving portion, of the turbine wheel.

In accordance with a further development of the invention, it is advisable that the converter bypass clutch comprise at least one friction lining having a radially inner marginal portion and a radially outer marginal portion, the pressure applying section of the piston being disposed substantially midway between the two marginal portions.

It is particularly advantageous if the converter bypass clutch comprises at least one friction lining having a radially inner marginal portion and a radially outer marginal portion, the pressure applying section of the piston being located substantially radially inwardly or outwardly of the middle between the two marginal portions.

It is also of advantage if the bypass clutch comprises a plenum chamber for the application of pressurized fluid to the piston in order to regulate the magnitude of the torque adapted to be transmitted by the clutch, the pressure applying section of the piston being disposed substantially radially outwardly of the plenum chamber.

In accordance with a further inventive concept, it is of advantage if a hydrodynamic torque converter is designed in such a way that it comprises a plenum chamber for the application to the piston of a pressurized fluid in order to regulate the magnitude of the torque adapted to be transmitted by the clutch, the pressure applying section of the piston being disposed substantially radially outwardly of the plenum chamber and the converter bypass clutch constituting a multiple-disc clutch with two laminae non-rotatably connected to the housing and a clutch friction disc disposed axially between the laminae, the pressure applying section of the piston serving to apply pressure in the axial direction against one of the laminae.

It is of advantage if the radially outer portions of the two laminae are provided with teeth which form-lockingly and non-rotatably engage complementary teeth of the housing, the clutch disc which is disposed between the two laminae being connected with the turbine wheel or with the input part of the damper.

It is equally advisable that the radially inner portion of the axially movable piston surround and be centered by a stub which is non-rotatably connected with the housing, the stub having channels serving to convey a fluid or pressure medium into a plenum chamber. Additional advantageous embodiments are described in the patent claims 54 to 58.

Figure 5:
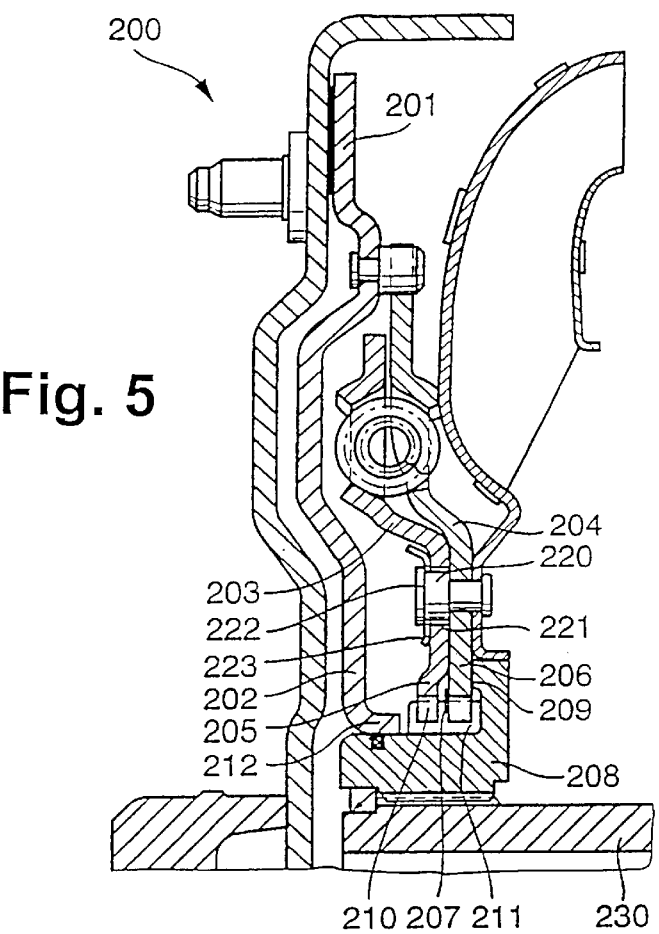
Figure 5A:
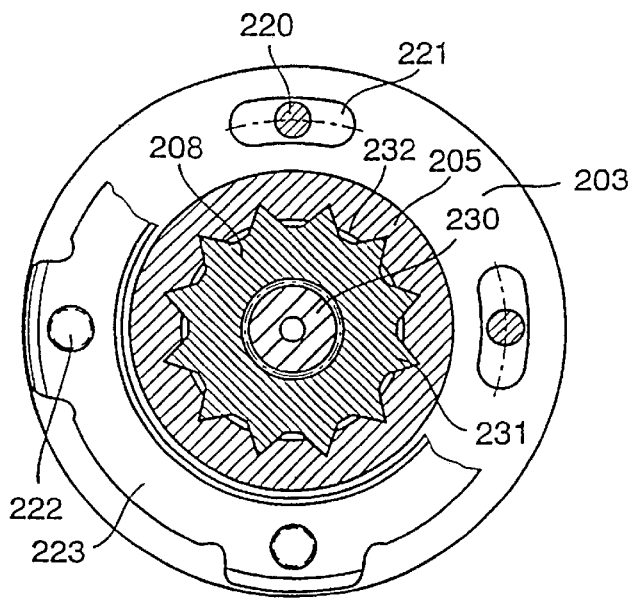
Figure 5B:
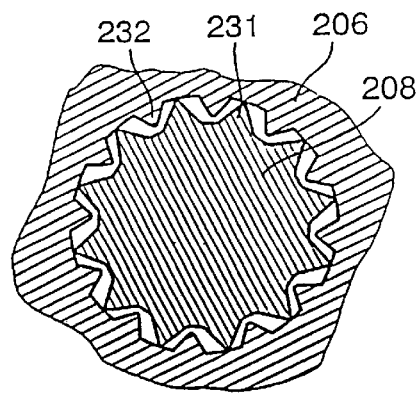
Figure 7:
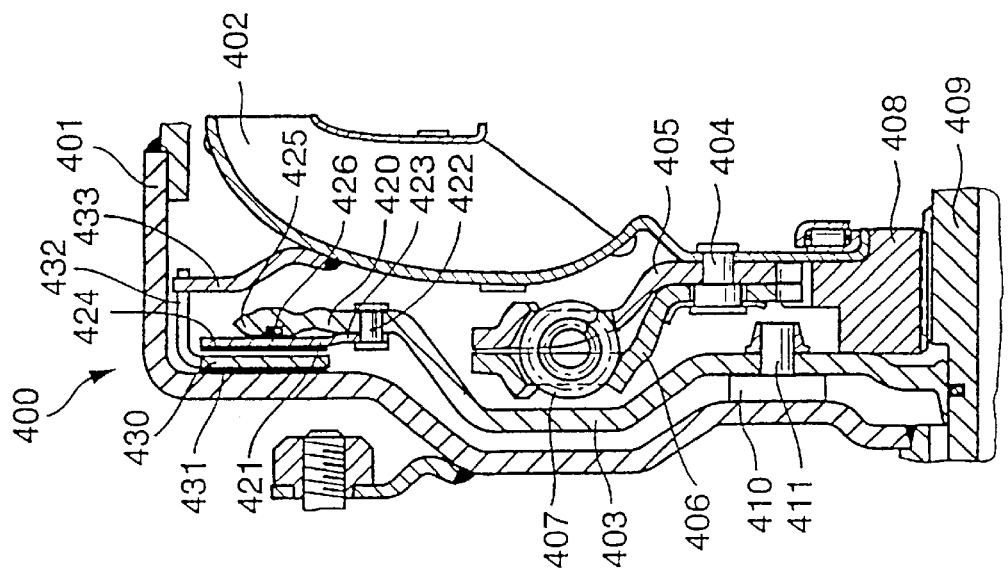
Figure 6:
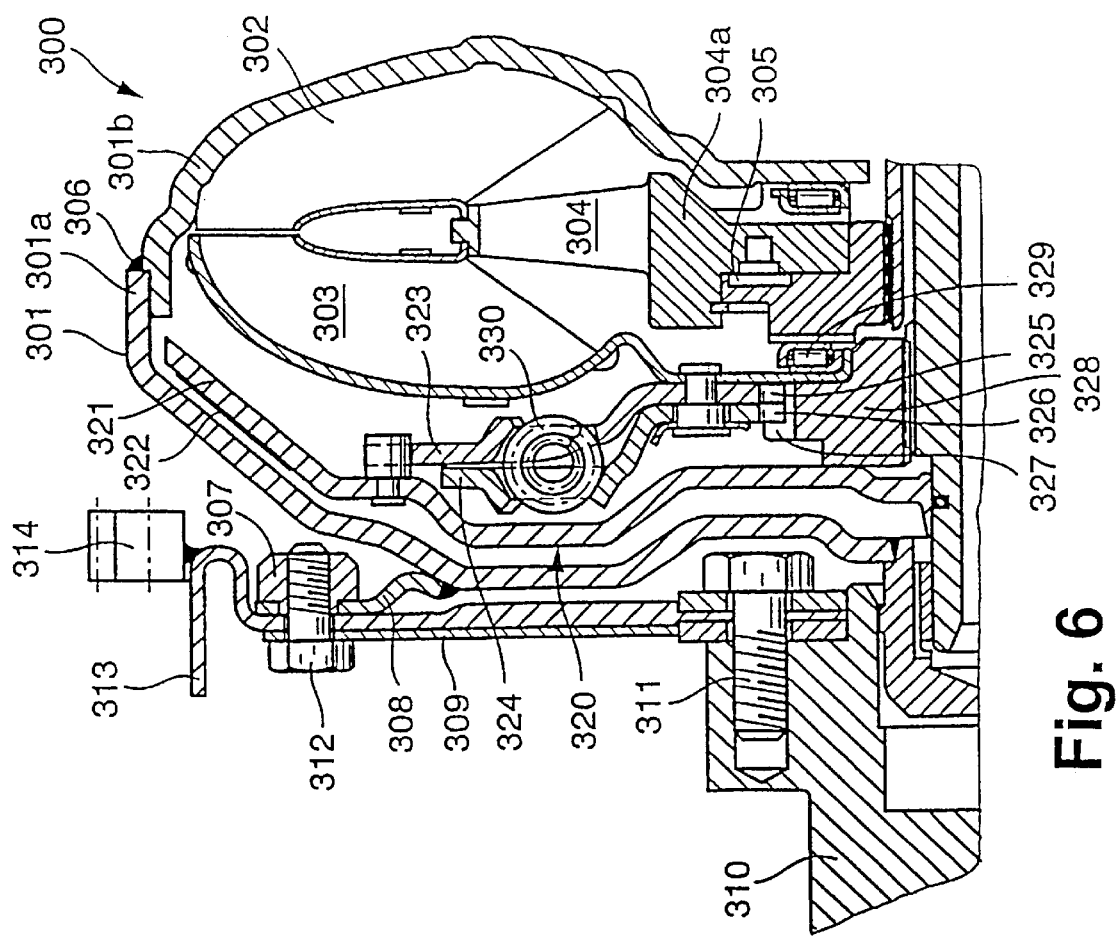
Figure 10:
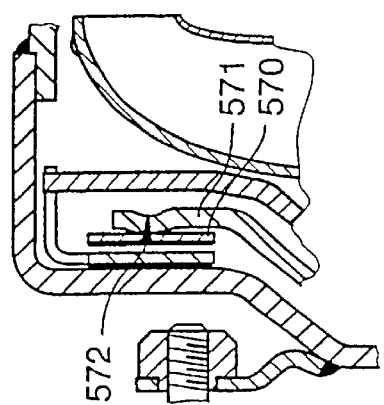
Figure 9:
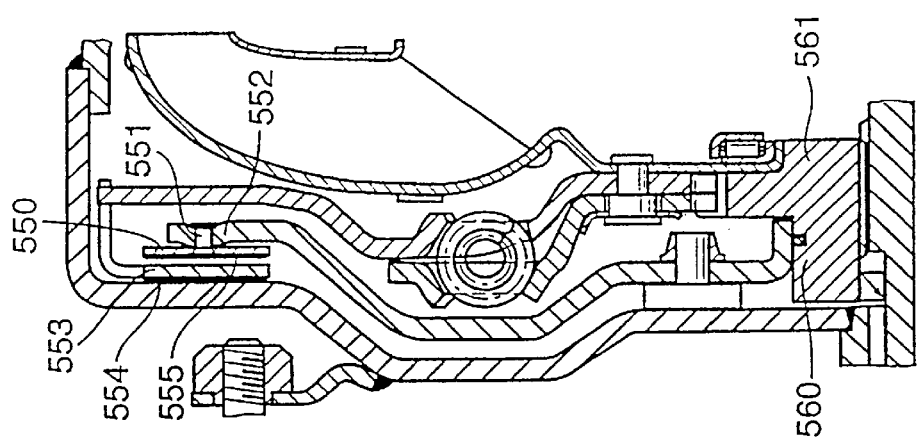
Figure 8:
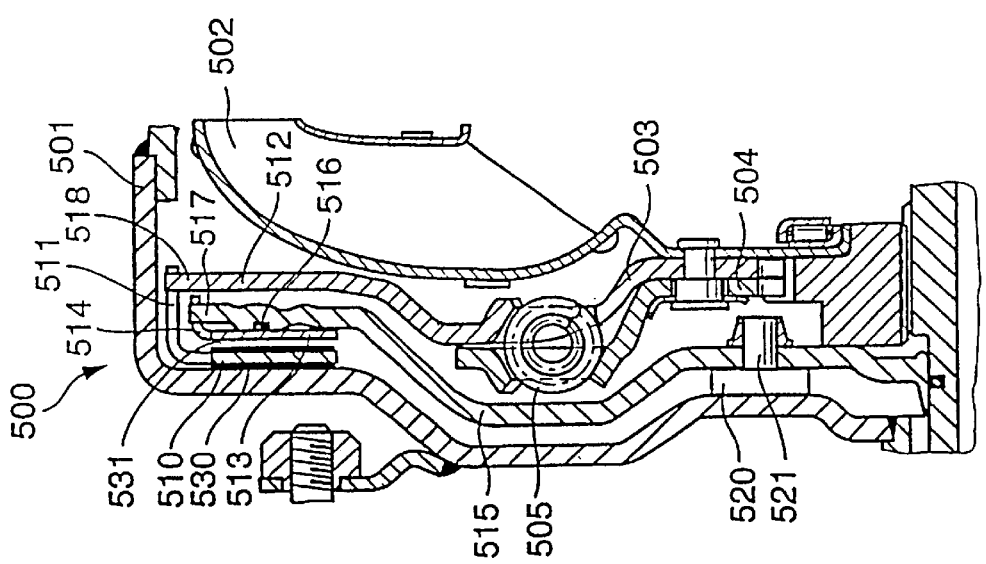
Figure 11:
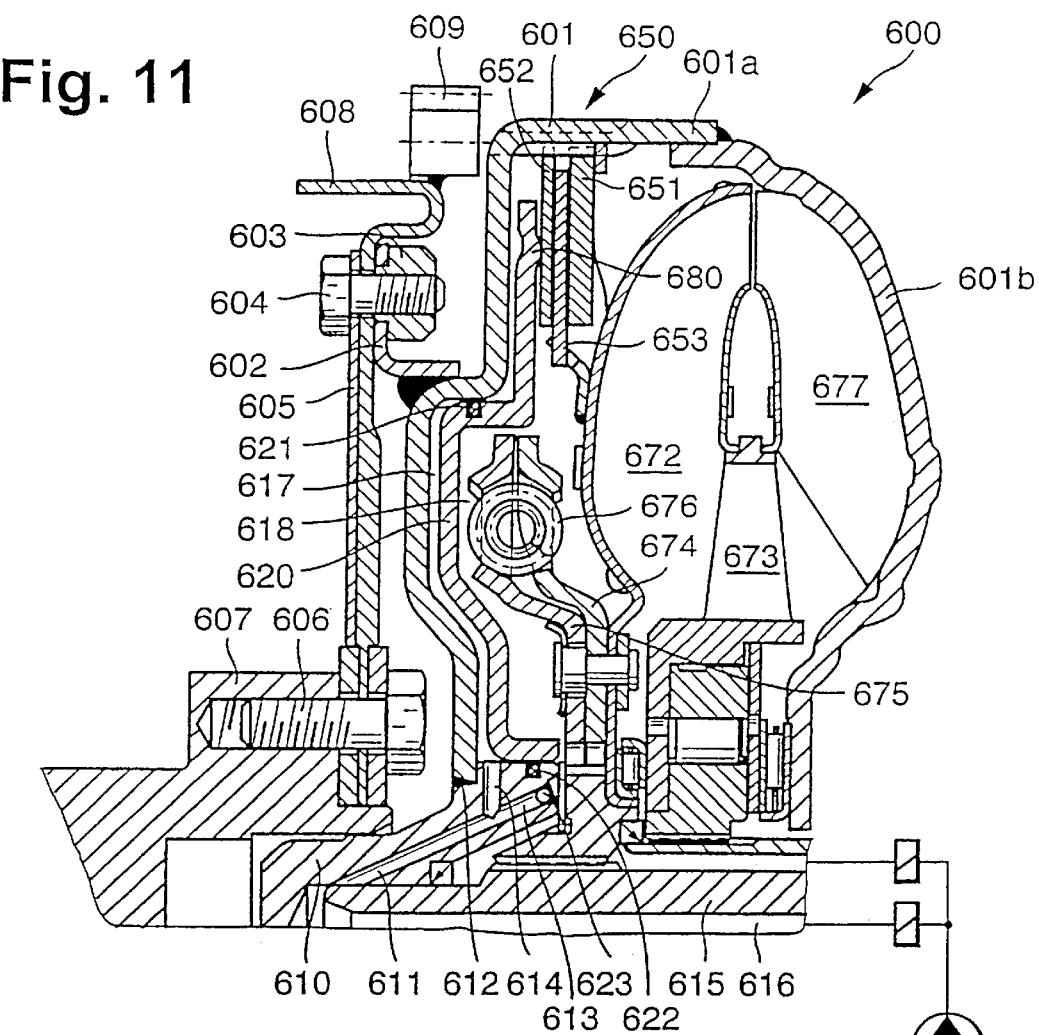
Figure 11A:
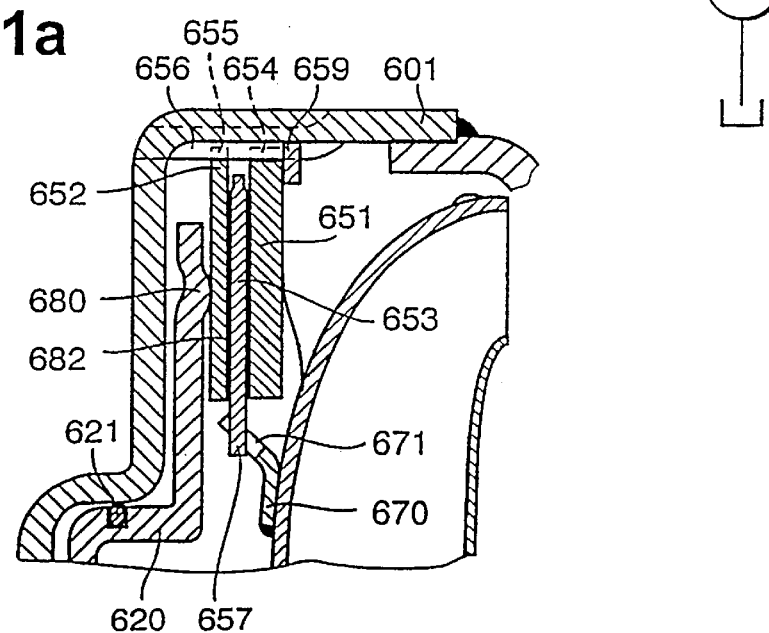
Figure 12:
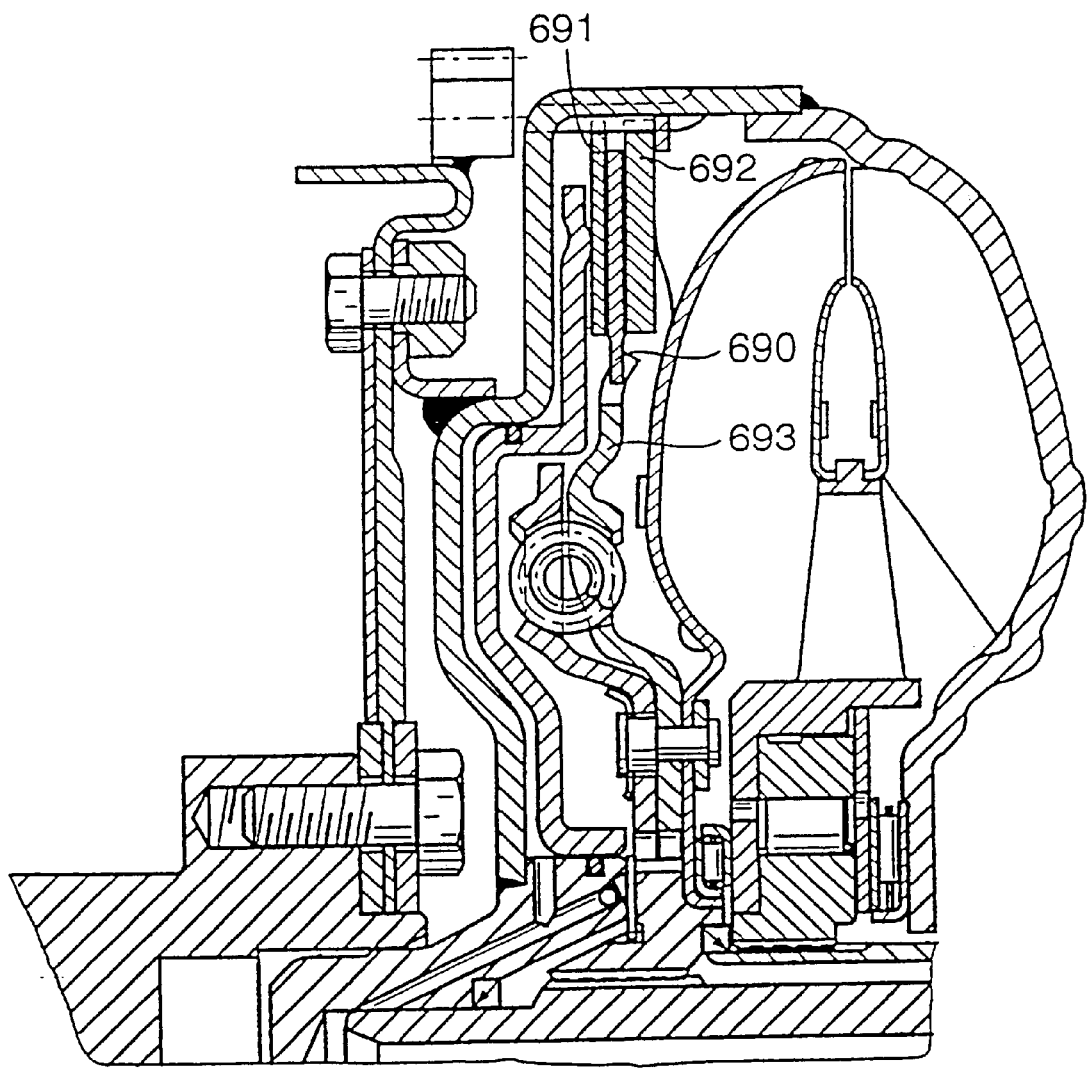
Figure 12A:
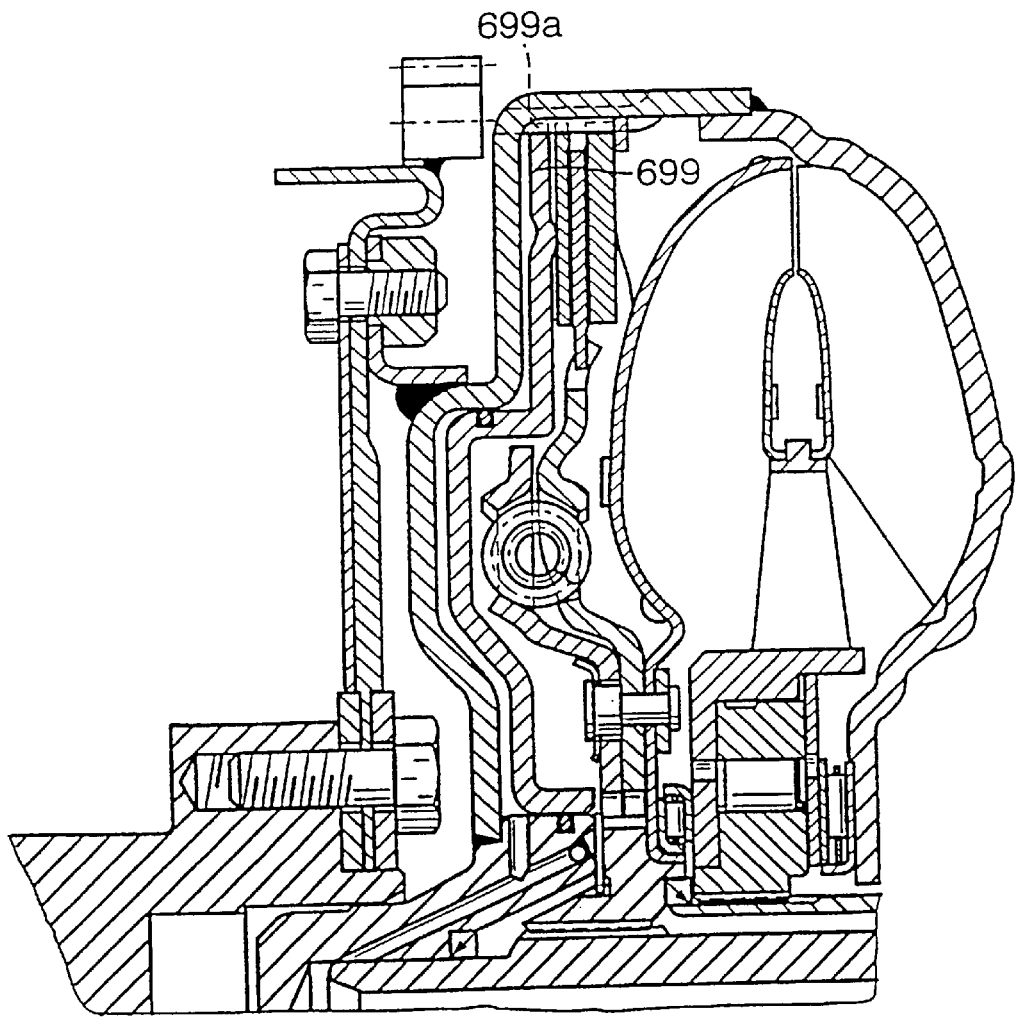
Figure 13:
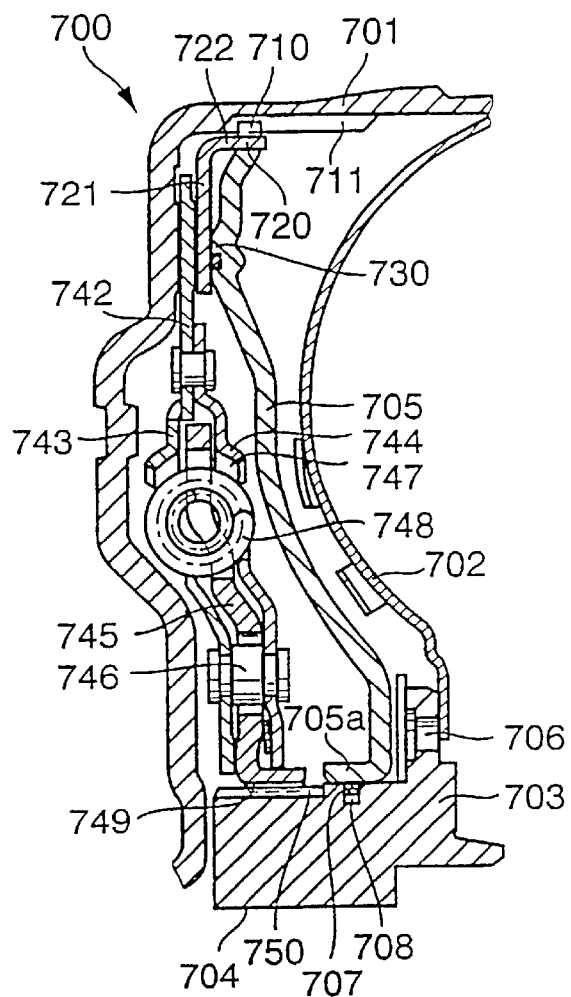
Figure 13A:
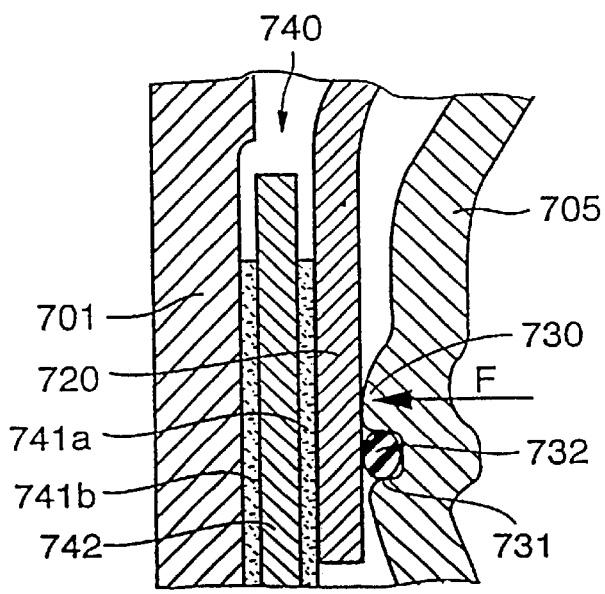
Figure 14:
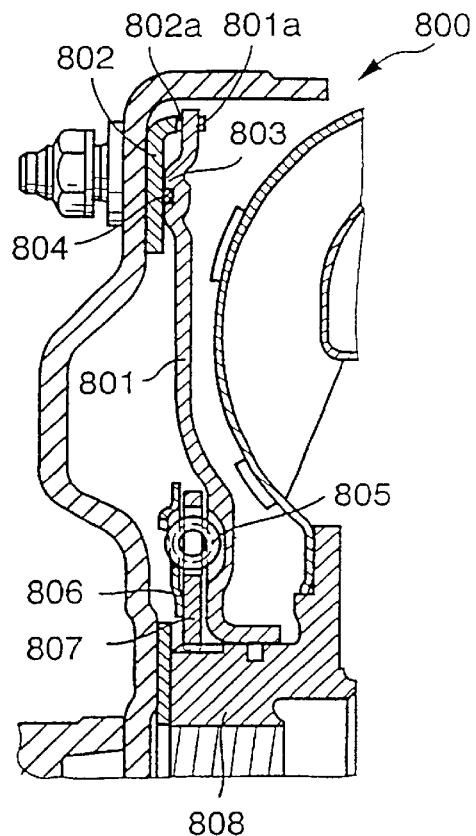
Figure 15:
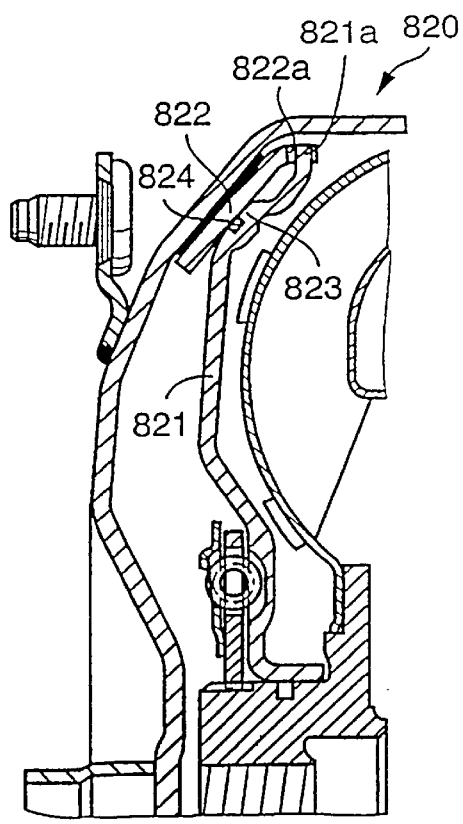
Figure 16:
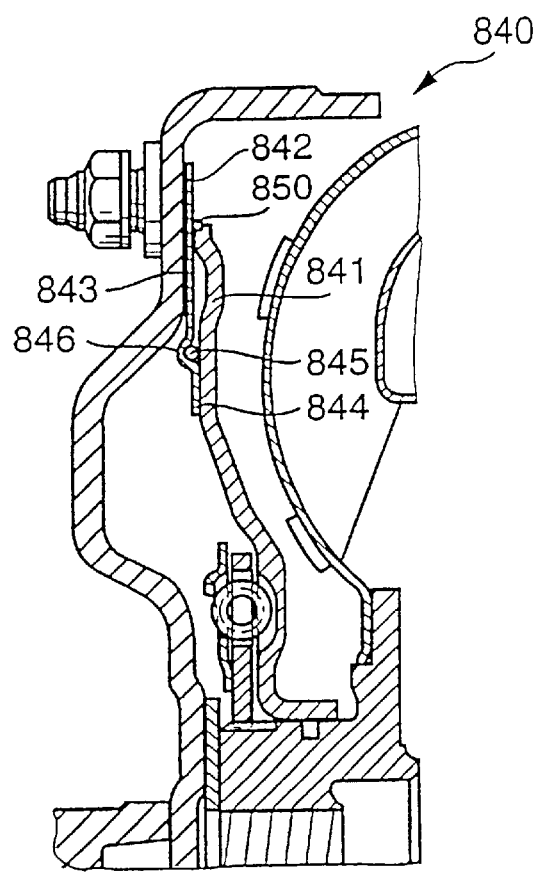
Figure 16A:
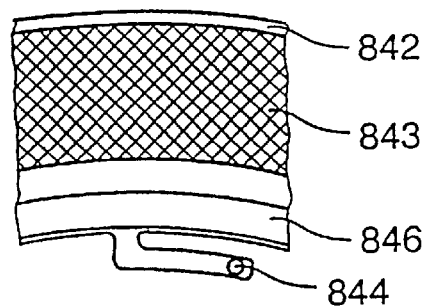
Figure 17:
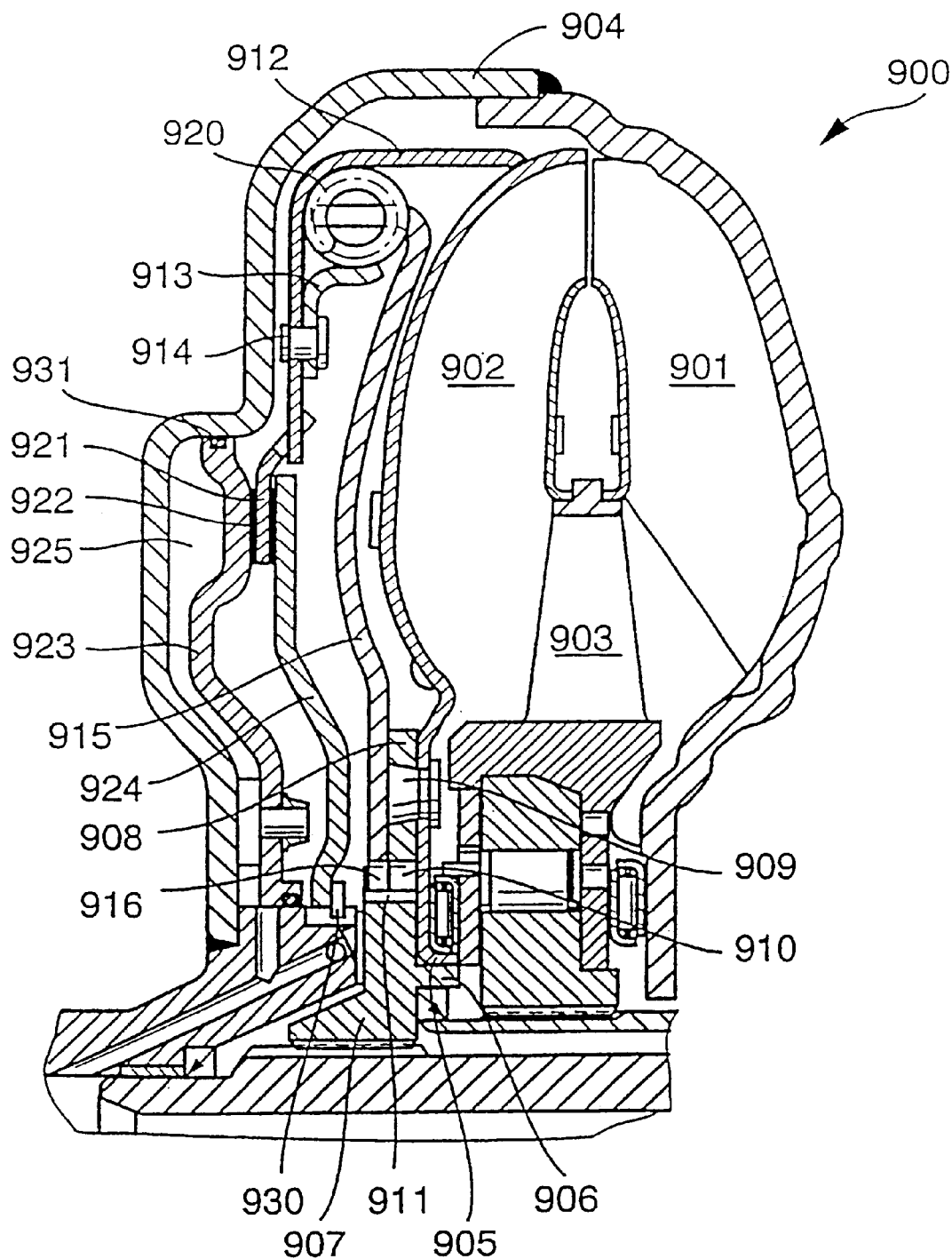
Figure 18:
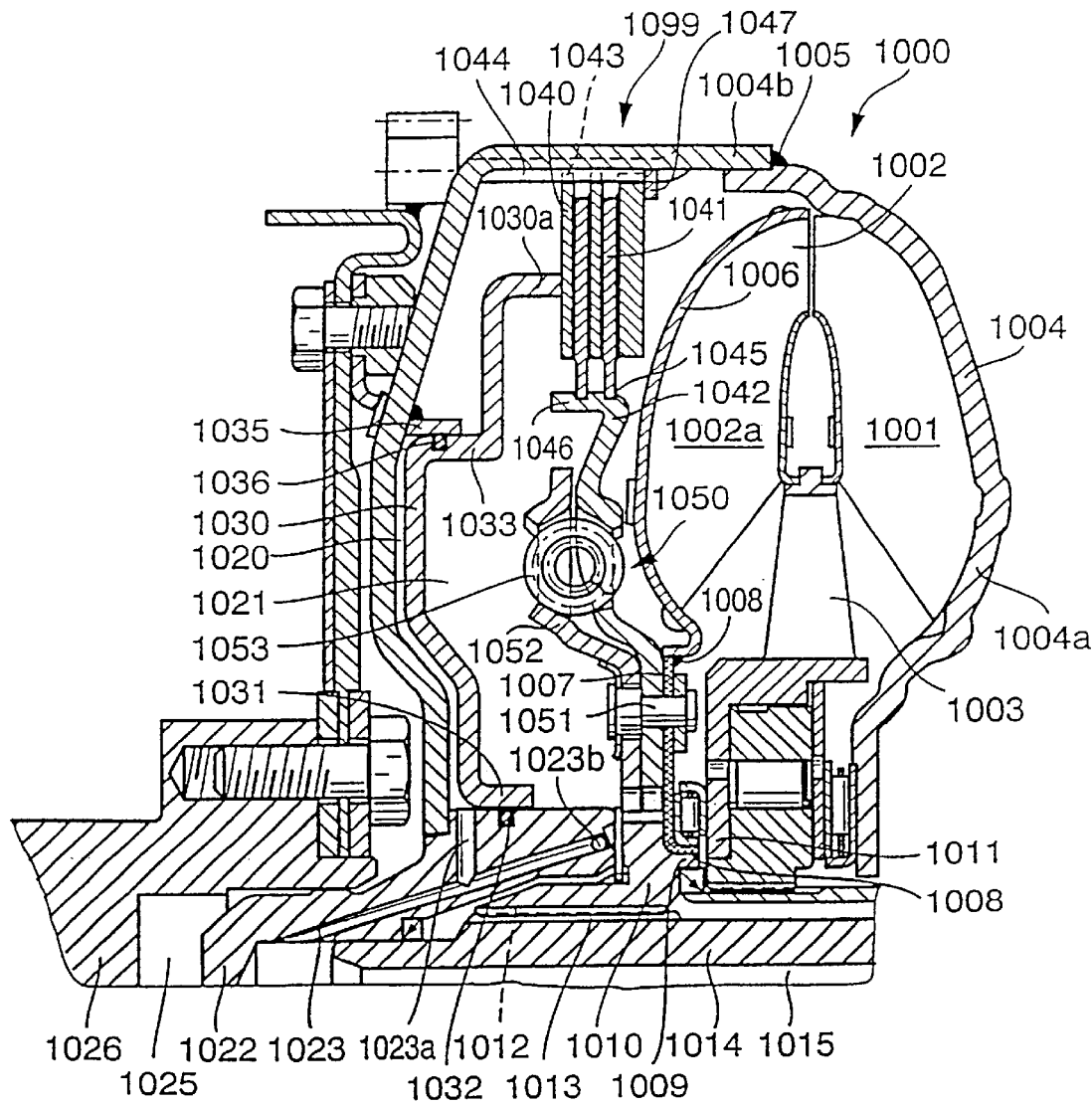

The invention will be explained in greater detail with reference to the embodiments which are shown schematically in the drawings. There are shown in:

FIG. 1 a fragmentary sectional view of a torque converter,
FIG. 1a a detail with bolts and disc,
FIG. 1b a detail with bolt and disc,
FIG. 2 a sectional view of a detail,
FIG. 3a a sectional view of teeth,
FIG. 3b a sectional view of teeth,
FIG. 4 a fragmentary sectional view of a torque converter,
FIG. 4a a sectional view of teeth,
FIG. 4b a sectional view of teeth,
FIG. 4c a detail with bolt and disc,
FIG. 5 a sectional view of a hydrodynamic torque converter,
FIG. 5a a sectional view of a hub,
FIG. 5b a sectional view of a hub,
FIG. 6 a sectional view of a hydrodynamic torque converter,
FIG. 7 a sectional view of a hydrodynamic torque converter,
FIG. 8 a sectional view of a hydrodynamic torque converter,
FIG. 9 a sectional view of a hydrodynamic torque converter,
FIG. 10 a view of a detail of a hydrodynamic torque converter,
FIG. 11 a sectional view of a hydrodynamic torque converter,
FIG. 11a a view of a detail of a hydrodynamic torque converter,
FIG. 12 a sectional view of a hydrodynamic torque converter,
FIG. 12a a sectional view of a hydrodynamic torque converter,
FIG. 13 a sectional view of a hydrodynamic torque converter,
FIG. 13a a view of a detail of a hydrodynamic torque converter,
FIG. 14 a sectional view of a hydrodynamic torque converter,
FIG. 15 a sectional view of a hydrodynamic torque converter,
FIG. 16 a sectional view of a hydrodynamic torque converter,
FIG. 16a a view of a detail of a hydrodynamic torque converter,
FIG. 17 a sectional view of a hydrodynamic torque converter, and
FIG. 18 a sectional view of a hydrodynamic torque converter.

FIG. 1 shows a hydrodynamic torque converter 1 with a non-illustrated pump wheel which is disposed in a housing 2 and is non-rotatably connected with the housing. The housing is coupled, by fastener means 50, to and is driven by the flywheel of a combustion engine or by a crankshaft. The torque converter further comprises a stator wheel, not shown. The turbine wheel 3 and its turbine wheel vanes 3a are installed in the circulating fluid stream of the torque converter. The turbine wheel 3 comprises a radially inner ring-shaped section 4 which is rotatably journalled on the output hub 5. A piston 6 of a converter bypass clutch 10 is received between the housing 2 and the turbine wheel 3 to divide the space section between the housing 2 and the turbine wheel 3 into two annular spaces 11, 12. These annular spaces 11 and 12 serve for the application of pressure by a pressurized medium for regulation of the converter bypass clutch 10. This renders it possible to open, namely disengage, the clutch, to operate the clutch with slip or to close, namely engage, the clutch.

The piston 6 of the converter bypass clutch 10 comprises a ring-shaped radially inner section 6a which extends in the axial direction and by means of which the piston is axially shiftably and, if necessary, rotatably mounted on the hub. The axially extending radially inner section 6a of the piston 6 is mounted on a supporting extension 5a of the hub 5. A sealing element 7, such as an O-ring, is received in a circumferential groove between the piston section 6a and the extension 5a of the hub. In this manner, the anular space 11 is sealed from the annular space 12 in the region where the piston is journalled on the hub, even during axial shifting of the piston.

The damper 20 of the hydrodynamic torque converter 1 comprises an input part 21 and an output part 22. Each of the input and output parts is a substantially circular ring-shaped component, such as a disc-shaped element, e.g., a stamping. Energy storing elements, such as springs, compression springs, elastic elements or rubber elements, are installed in the torque transmitting path between the two circular ring-shaped components, and the two components 21, 22 are turnable relative to each other against the resistance of the energy storing elements. The input part 21 an the output part 22 comprise receiving sections or receiving windows 23,24 which can be designed to be fluid-tight or to be open for the flow of a fluid stream. Such receiving means can be made by stamping or reshaping of material. The energy storing elements 25,25a which, for example, can be mounted to be coaxial with each other, are installed in the receiving means in axially fixed positions relative to the input and output parts to thus ensure that they cannot be lost.

The annular radially inner section, such as a ring-shaped section, of the turbine wheel 3 is non-rotatably connected with the input part of the damper. For example, this can be achieved by resorting to a connection including a rivet 30. The rivet 30 connects the input part 21 with the radially inner marginal section 4 of the turbine wheel 3. At the same time, the rivet head 31 extends through an opening 32 in the output part 22. This determines the maximum extent of turning of the input part relative to the output part because, when the maximum angle of angular displacement is reached, the rivet head abuts the surface at the end of the opening 32 to thus prevent further turning of the input and output parts relative to each other. Furthermore, the rivet head secures a safety ring 34 which fixes the output part 22 relative to the input part 21 in the axial direction. In lieu of the axially projecting rivet head, one can also employ an axially projecting lug which is a part of the input or output part of the damper and extends, with angular play, into a receiving section 32 of the output or input part of the damper. When the axially extending element 31 would abut the surface at one end of an opening 32, it would thus limit the extent of angular displacement of the input and output parts provided that the entraining teeth between the input part and the hub would abut each other and would thus limit the extent of angular displacement before the element 31 would reach the aforementioned surface. Under such circumstances, the extent of angular displacement between the input part and the output part due to reception of the axially projecting element into a receiving section is greater than the extent of angular dsplacement of the input part and the hub relative to each other. However, it is particularly advantageous if the extent of angular displacement of the two damper parts, such as the input part and the output part, relative to each other is limited by the radially inwardly located teeth.

Starting at the turbine wheel 3, torque is being transmitted by way of the radially inner section 4 and the riveted connection to the input part 21 of the damper 20. Starting at the piston 6 of the converter bypass clutch 10, torque is being transmitted from the housing by way of the friction surface 40 of the piston 6 and by way of the axially projecting finger, such as the element 41, e.g., a rivet, which extends into a receiving section 42 of the input part 21, to the input part 21 of the damper 20. Instead of the rivet, one can utilize an axially protruding lug which can constitute a displaced part of the piston or of a disc-shaped portion of the damper. The axially projecting element 41 extends into a receiving section 42 of the input or output part in a form-locking or non-rotatable manner. The piston carries a friction lining, and the latter is provided with a first friction surface 40a which can be moved into engagement with a second friction surface 2a, such as a complementary friction surface of the housing. Furthermore, it can also be of advantage if the friction lining 40 and its friction surface 40a are provided on the housing and the second friction surface, such as a complementary friction surface, is provided on the piston.

Transmission of torque from the input part 21 to the output part 22 takes place by way of the energy storing elements 25,25a.

The radially inner sections of the input part 21 and the output part 22 are provided with teeth, such as entraining teeth 51, 52, e.g., in the form of internal gears, which mate with the corresponding or complementary teeth, such as entraining teeth of external teeth 53, of the hub 5. The teeth 51,53 between the output part 22 and the hub 5 mate with each other essentially without play. The teeth 52,53 between the input part 21 and the hub 5 mate with angular play. This renders it possible to achieve that, when the torque which is being transmitted by way of the damper is less than a maximum damper torque, torque is being transmitted to the hub 5 by way of the energy storing elements and the teeth 51,53. At such time, the energy storing elements 25 are stressed and displaced through an angle which is determined by the torque so that the input part is turned relative to the output part. When the torque to be transmitted by the energy storing elements rises to the maximum torque of the damper, the extent of angular displacement between the input and output parts reaches a maximum value which is determined by angular play between the input part and the hub in the region of the teeth. The teeth 52,53 when engage each other without play and the transmission of torque from the input part to the hub 5 takes place by way of the teeth 52,53.

The input part 21 and the output part of the damper are coaxial with and are disposed next to each other, as seen in the axial direction. The teeth 51,52 of the input part 21 and output part 22 and the external teeth 53 of the hub 5 form two pairs of mating teeth.

If the transmission of torque takes place from the piston 6 or from the turbine wheel 3, the flow of torque, until the extent of angular displacement between the input part and the hub reaches a maximum value, takes place by way of the energy storing elements and thereupon by the pair of teeth 51,53 on to the hub. When the maximum extent α of angular displacement is reached, the teeth 52 strike the teeth 53. Thereafter, the transmission of torque from the input part to the hub takes place by way of the pair of teeth 52,53.

The transmission of torque from the hub to the input shaft 56 of the transmission takes place by way of the internal teeth 55 of the hub and the teeth of the transmission input shaft 56.

FIG. 1a is a fragmentary elevational view of the output part of the damper, there being shown the heads 31 of the rivets which connect the parts 4 and 21 to each other. The rivet heads extend through the openings 32 in the output part 22 so that the extent of angular displacement between the output part and the input part at most equals the angle α'. The teeth 52 and 53 strike against each other already after a turning through an angle α<α'. In accordance with another embodiment of the invention, it can be of advantage if α≧α'. A safety disc 34 which is disposed in front of the output part of the damper is also carried by and is axially fixed by the rivet heads. This safety disc further serves to generate a basic friction in the damper.

FIG. 1b illustrates a detail with a bolt 41 which extends into a socket 42 of the disc 23 in order to non-rotatably connect the piston with the input part.

FIG. 2 illustrates a further embodiment of the invention wherein the piston 6 is not mounted radially on and centered by a flange or an extension 5a of the hub; instead, the piston 6 is carried and is centered by the transmission input shaft 56. For the purpose of sealing, the external surface of the shaft 56 is provided with an annular groove or circumferential groove which receives a sealing ring 57, such as an O-ring.

FIGS. 3a and 3b illustrate the teeth 53 of the hub and the teeth 52 and 51 of the input and output parts in a sectional view. The input part 21 has teeth which mate with the teeth 53 of the hub 5. The width of the tooth spaces 60 between the teeth 52 of the input part exceeds the width of individual teeth of the set of teeth 53 on the hub 5. The width 60 extends along an arc 2*α. This results in an angular play between the input part and the hub. The teeth 53 of the hub 5 also mesh, without play, with the teeth 51 of the output part 22. The tooth spaces between the teeth of the output part are dimensioned in such away the teeth of the output part and the teeth of the hub mesh without play.

It is of advantage if the teeth 52 and the teeth 51 are realized in the sheet metal of each of the input and output parts so that wide tooth spaces alternate with narrow tooth spaces. This renders it possible to ensure that, by turning the sheet metal parts relative to the hub through 60 degrees, one obtains a play-free toothed connection between the hub and one of the parts, such as the part, e.g., the input part, which rotates with the housing and a toothed connection with play between the hub and the other part, e.g., the output part, which rotates with the turbine.

FIG. 4 is a fragmentary sectional view of a hydrodynamic torque converter 100 which embodies another form of the invention and has a pump wheel, not shown, provided in and non-rotatably connected to a housing 102. The housing 102 is secured, by means of fastener means 150 such as fastener eyelets, to a flywheel or to a crankshaft of a combustion engine.

The turbine wheel 103 is installed in the circulating fluid stream of the torque converter. This turbine wheel 103 comprises a radially inner ring-shaped section 104 which is rotatably mounted on the output hub 105. Between the housing 102 and the turbine wheel 103, there is received an axially movable piston 106 which forms part of a converter bypass clutch 110 and divides the space between the housing 102 and the turbine wheel 103 into two annular spaces 111,112.

The piston 106 comprises a radially inner ring-shaped section 106a which extends in the axial direction. The piston is axially shiftable along and, if necessary, rotatable on a transmission input shaft 156. A sealing element 157, such as an O-ring, is received in a circumferential groove between the piston section 106a and the transmission input shaft 156. In this manner, the annular space 111 is sealed relative to the annular space 112 in the region where the piston is journaled on the hub, even in the event of axial shifting of the piston.

The damper 120 of the hydrodynamic torque converter 100 comprises an input part 121 and an output part 122. Each of these input an output parts is a substantially circular ring-shaped component, such as a stamping. Energy storing elements, such as springs, compression springs, elastic elements or rubber elements, are installed in the torque transmitting path between the circular ring-shaped components 120,121 and the two components 120,121 are turnable relative to each other against the restoring force of the energy storing elements. The input part 121 and the output part 122 are provided with receiving portions or receiving windows 123,124 which are fluidtightly sealed or can be open to permit a fluid to flow therethrough. Such receiving means can be formed by stamping or reshaping of material. The energy storing elements 125,125a which, for example, can be coaxial with each other, are installed in the receving means substantially in axially fixed positions relative to the input and output parts to thus prevent them from becoming lost.

The ring-shaped radially inner section of the turbine wheel 103 is non-rotatably connected with the output part 122 of the damper. This is achievable, for example, by way of a connection including rivets 130. The illustrated rivet connects the output part 122 with the radially inner section 104 of the turbine wheel 103. At the same time, the head 131 of the rivet extends through an opening 132 in the input part 121. This renders it possible to achieve a maximal angular displacement of the input part relative to the output part because, when the maximum angle of angular displacement is reached, the rivet abuts the surface at the end of the opening 132 and thus limits the extent of angular movement of the input and output parts relative to each other. At the same time, the rivet head further serves to secure a safety ring 134 which secures the input part 121 relative to the output part 122 in the axial direction of the torque converter.

Starting at the turbine wheel 103, torque is being transmitted to the output part 122 of the damper 120 by way of the radially inner section 104 and the connection including the rivets 130. Starting from the piston 106 of the converter bypass clutch 110, torque is being transmitted from the housing 102 by way of the friction surface 140 of piston 106, by way of an axial finger 141, e.g., a rivet, which extends into the receiving portion 142 of the input part 121, and to the input part 121 of the damper 120. Such arrangement is also shown, in a sectional view, in FIG. 4c. From the input part 121, torque is being transmited to the output part 122 by way of the energy storing elements 125,125a.

The radially inner marginal portions of the input part 121 and output part 122 are respectively provided with teeth 151,152, such as internal gears, which mate with the teeth 153, such as an external spur gear, of the hub 105. The teeth 151, 153 between the input part 121 and the hub 105 mesh with play. The teeth 152, 153 between the output part 122 and the hub 105 mate substantially without play. This ensures that, when the damper 120 transmits a torque which is less than a maximum damper torque, while the clutch is engaged or operates with slip, torque is being transmitted by way of the energy storing elements and the teeth 151,153 on to the hub. At such time, the energy storing elements are stressed and compressed through a predeterminable angle so that the input part 121 turns relative to the output part 122.

When the torque to be transmitted by the energy storing elements of the damper rises to match the maximum torque of the damper, the extent of angular displacement of the input and output parts reaches a maximum value such as is determined by the angular displaceability of the input part and the hub relative to each other due to the play between the respective teeth. The teeth 152 then abut the teeth 153 and the torque is being transitted to the hub 105 by way of the teeth 152,153.

The input part 121 and the output part of the damper are coaxial with and axially adjacent each other. The teeth 151,152 of the input part 121 and the output part 122 respectively constitute with the external teeth 153 of the hub 105a first and a second pair of mating gears.

If the torque is being transmitted by way of the piston, the transmission of torque takes place by way of the energy storing elements and thereafter by the pair of mating gears 151,153 on to the hub. When the maximum angular displacement α is reached, the teeth 151 strike the teeth 153. After such maximum angular displacement is exceeded, the transmission of torque from the input part to the hub takes place by way of the pair of gears including the teeth 151,153.

FIGS. 4a and 4b illustrate the teeth 153 of the hub and the teeth 152 and 151 of the input and output parts in sectional views. The input part 121 has teeth 151 which mate with the teeth 153 of the hub 105. The width of tooth spaces 160 between the teeth 151 of the input part exceeds the width of individual teeth of the teeth 153 on the hub 105. The width 160 amounts to an angle 2*α. This causes the establishment of angular play between the input part and the hub. Furthermore, the teeth 153 of the hub 105 mate, without play, with the teeth 151 of the output part 122. This is due to the fact that the tooth spaces between the teeth of the output part receive the teeth 153 of the hub without play.

A damper which is constructed in a manner as shown in FIGS. 4 to 4c is a damper which damps torsional vibrations at the output of the converter bypass clutch. The damper according to FIGS. 1 to 3 is a damper at the output of the turbine. By interchanging the connection from 41 to 141 and by replacing the teeth 51,52 with 151,152, one can convert a damper at the output of the piston of the converter bypass clutch into a damper at the output of the turbine wheel.

A particular advantage of the aforedescribed dampers 20,120 is that the input part and the output part constitute disc-shaped elements which are coaxial with and are disposed next to each other and are mounted on the external teeth of the hub by way of their respective internal teeth. This renders it possible to avoid the need for an additional hub. It is of particular advantage if the teeth 152,151 are designed in such a way that, by rearranging and inverting the disc-shaped elements, one can arrive at a different damper characteristic.

The distribution of teeth on the two disc-shaped elements is such that, by way of example, the hub is provided with three teeth which are distributed at its periphery and have a width W and, in FIGS. 4a and 4b, are denoted by the characters 153. These teeth are spaced apart from each other by 120 degrees. The disc-shaped parts, such as the input part and the output part, have tooth spaces 160,161 one (160) of which has a width corresponding to the width of the teeth 153. These tooth spaces are spaced apart from each other by 120 degrees. Between these tooth spaces 160, there are disposed additional tooth spaces 161 having a width WG greater than the width of the teeth 153. These tooth spaces 161, too, are spaced apart from each other by 120 degrees, i.e., by 60 degrees relative to the narrow tooth spaces.

In addition to or in lieu of the aforedescribed arrangement with three teeth on the hub and with two times three tooth spaces in the disc-shaped components, it is also of advantage to select other types of arrangements with a larger or smaller number of teeth and tooth spaces.

In the aforedescribed embodiment, the converter bypass clutch constitutes a conical friction clutch. However, in accordance with another embodiment, the friction surface can constitute a plane surface. This is shown in FIG. 5. The hydrodynamic torque converter 200 includes a piston 202 having an annular radially outer section with a plane carrier surface 201 supporting a friction surface. Analogously, and as shown in the previously described Figures, the piston can carry a conical friction surface.

Basically, the hydrodynamic torque converter 200 is designed in the same way as the converters of FIGS. 1 and 4. An important difference is that the radially inner section 205 of the output part 203 has an s-shaped outline or comprises two bends whereas the radially inner section 206 of the input part 204 extends in the radial direction. In view of such configuration, there is established between the radially inner sheet metal portions of teeth forming part of the input part and the output part a space which is free to receive a securing ring 207. This securing ring 207, such as a split ring, is received in a circumferential groove of the external teeth on the hub and prevents axial migration of the input part of the damper. Thus, the securing ring 207 holds the input part axially between such securing ring and a radial shoulder 209 of the hub 208.

Between the external teeth 211 of the hub 208 and the axially extending radially inner foot 212 of the piston 202, there is provided a disc-shaped abutment 210, such as a sliding disc.

FIG. 5a is a sectional view taken in FIG. 5. There is shown the transmission input shaft 230 having teeth which mate with the internal teeth of the hub 208. There are further shown external teeth 231 forming part of the hub 208 and meshing with the teeth 232 of the radially inner section 205 of the output part 203. There are further shown pins 220 which are connected to the input part 204 and extend into the openings 221 of the output part. Upon completion of a certain angular displacement of the input and output parts of the damper relative to each other, the pins 220 come into abutment with surfaces at the ends of the respective openings 221. There is further shown the securing ring 223, which is retained by the rivet heads 22, axially between the piston 202 and the output part 203. However, it is particularly advantageous if the pins 220 cannot come into actual contact with the surfaces at the circumferential ends of the respective openings 221 but, instead, the extent of angular displacement of the input and output parts relative to each other is limited by the teeth in the region of the output hub, such as by means of abutting teeth or entraining teeth. In such embodiment, the length of the openings 221 in the circumferential direction exceeds the maximum extent of angular displacement or the extent of angular displacement permitted by such openings exceeds the maximum extent of actual angular displacement.

FIG. 5b shows the teeth 231 which are provided on the hub and mate with the teeth 232 of the radially inner section 206 of the input part 204. A certain angular play can take place between the hub and the input part 204. It is of advantage to select teeth in the form of splined shaft gears, channel toothing or serration gears.

It is of particular advantage in the illustrated dampers if the angular play between the output element and the hub is less than that between the input element and the output element. This ensures that excessive torques or torque peaks are not transmitted by the damper but are transmitted at the output side directly to the hub.

FIG. 6 illustrates an embodiment of the invention wherein the illustrated hydrodynamic torque converter 300 comprises a pump wheel 302 confined in a housing 301a, 301b, a turbine wheel 303 and a stator wheel 304. The stator wheel is carried by a stator wheel hub with a freewheel 305 which is effective in the direction of rotation. The housing 301 has two housing shells 301a,301b which are sealingly connected to each other by a welded joint 306. The housing carries fastener eyelets 307 which are mounted on sheet metal holders 308. Between the crankshaft 310 of a prime mover, such as a combustion engine, and the fastener eyelets, there is provided a flexible driver plate 309 which is secured to the prime mover by threaded connectors 311,312. The fastener eyelets are further connected with a circular ring-shaped support element 313 which carries the starter gear 314.

The converter bypass clutch is provided with a piston 231 having a friction surface 232, being axially shiftable along the transmission input shaft and surrounding a sealing element which is received in a peripheral groove of the input shaft. The piston is centered on the input shaft in the radial direction. The friction surface of the piston is basically a cone of a section of a cone. The complementary friction surface, which is provided within a portion of the housing, is also a cone or a section of a cone.

The damper 320 comprises an input part 323 and an output part 324, the transmission of torque between the input and output parts being effected by energy storing elements. The input and output parts are turnable relative to each other through a predetermined angle against the effect of restoring force of the energy storing elements. The energy storing elements 330 are received in receiving sections, such as spring-receiving windows, in the basically circular ring-shaped sheet metal portions of the input and output sections.

The radially inner portions of the input and output parts respectively comprise teeth 325,326 meshing with the external teeth 327 of the hub 328. The teeth 326 of the output part 324 mate with the teeth 327 of the hub 328 without angular play. The teeth 325 of the input part 323 mate with the teeth 237 of the hub 328 with angular play. Thus, the output part of the damper and the hub are connected to each other by motion transmitting entraining gears but the connection between the input part and the hub comprises gears which can turn relative to each other before they come into abutment with one another.

The turbine wheel 303 has a ring-shaped radially inner section which is secured to the sheet metal part 323 by means of rivets. Furthermore, the radially inner section of the turbine wheel, which section extends in the axial direction, is mounted on, journalled on and centered in the radial direction by an extension of the hub 328.

An axial bearing 329 is provided between the hub 328 and the hub of the stator wheel, the same as between the stator wheel hub and the housing.

Each of the torque converters shown in FIGS. 1, 5 and 6 comprises a rotation-preventing connection between the turbine wheel and the piston of the converter bypass clutch, and the turbine wheel is non-rotatably connected with the input part, the same as the piston.

FIG. 7 illustrates an embodiment of a hydrodynamic torque converter 400 with a housing 401 and a turbine wheel 402 which is disposed in the housing. The turbine wheel is non-rotatably secured to the input part 405 of the damper by means of a connector 404 and the transmission of torque, at least within a first stage of angular movement between the input part 405 and the output part 406, takes place by way of the energy storing elements. The transmission of torque directly by way of abutting teeth on the input part and the hub 408, and from there to the input shaft of the transmission in a manner as already described hereinbefore, takes place only during a second stage of angular movement of the input and output parts relative to each other.

The piston 403 is axially shiftably mounted on the input shaft 409 of the transmission and is centered thereon in the radial direction. In accordance with a further embodiment, it is also possible to resort to the hub as a means for centering the piston 403 in the radial direction.

The piston 403 is mounted, by means of energy storing elements 410, such as leaf springs, against appreciable rotation relative to the housing but is shiftable axially against the restoring force of the leaf springs. One end portion of each leaf spring is secured to the piston 403 by means of a rivet head 411, and the other end portion of each leaf spring is affixed to the housing. Owing to axial mobility of the piston 403, the latter undergoes a minor angular displacement due to the fact that it is mounted on the leaf springs. However, it would also be possible to employ an expansion or a compression spring in lieu of the leaf springs.

The annular radially outer section 420 of the piston 403 supports a ring-shaped friction lining carrier 421 having a radially inner portion provided with fastening tongues 423 affixed to the piston 403 by rivets 422. The friction lining carrier 421 has a side confronting the housing and supporting a friction lining 424. In addition to the fastening section where the friction lining carrier 421 is secured to the piston by riveting or be welding of by a form-locking connection, the piston also supports the friction lining carrier 421 in the latter's central portion and at that side which faces away from the friction lining 421. In such region, the piston 403 comprises an annular section 425 which serves as an abutment surface contacting the lining carrier 421. A sealing element 426, such as an O-ring, is disposed at the annular section to be engaged by the lining carrier 421 and the abutment surface of the piston 403.

The annular abutment section 425 is disposed substantially radially centrally of the friction lining 424 so that, when the friction lining 424 is subjected to the action of a force, the force which is being transmitted by the piston is distributed homogeneously upon the friction surface. In this manner, one can practically avoid any tilting of the friction surface while permitting such minor tilting which is necessary to compensate for geometrical departures of the complementary friction surface from an ideal surface.

Axially between the friction surface 424 and the housing 401, there is disposed a lamina 430 which, in the region of its radial extension, carries a friction lining 431 confronting the housing. The other side of the lamina, namely the side facing away from the housing, is provided with a complementary friction surface. The axially extending section 432 of the lamina 430 is non-rotatably connected with the turbine wheel by means of a circular ring-shaped sheet metal connector 433. This connector, in turn, has a radially inner portion which is welded to the turbine wheel. The connection between the sheet metal connector and the lamina can constitute a rotation-preventing form-locking connection wherein radially outer teeth of the component 433 mate with the teeth of the axially extending arm 432. However, in accordance with a further embodiment, the lamina can be welded to the sheet metal connector.

When the engagement of the clutch is such that the clutch is at least slipping, the transmission of torque takes place by way of the lamina to the turbine wheel and thence by way of the input part and output part on to the hub or directly to the hub. In view of the fact that the piston cannot turn elative to the housing, it does not participate in the transmission of torque to the output.

FIG. 8 illustrates a further embodiment of the invention, namely a hydrodynamic torque converter 500 having a housing 501 and a turbine wheel 502. The damper includes an input part 503 and an output part 504, energy storing elements which operate between the input and output parts serving to oppose angular movements of such parts relative to each other. The input and output part constitute circular ring-shaped sheet metal components.

In a manner as described with reference to FIG. 7, the piston 515 of the converter bypass clutch is non-rotatably but axially movably mounted by way of leaf spring 520 and rivet element 521. Between the piston and the complementary friction surface, there is disposed a circular ring-shaped element, such as a lamina, which can also comprise at least one friction surface, a complementary friction surface or a friction lining. The lamina, the radially extending section of which constitutes a complementary friction surface, has a radially outer axially extending section 514 provided with teeth mating with complementary teeth 517 of the piston 515 so that the lamina is suspended on the piston. Thus, the lamina 513 is non-rotatably attached to the piston 515. At the radially central region of the lamina 513, the piston is provided with a contact section, such as a force applying section, which serves to prop the lamina against the piston. Radially outwardly of the contact section, there is provided a sealing element, such as an O-ring, which is disposed or received in a circumferential groove and serves to seal the piston at the circular ring-shaped element, such as the lamina. The groove can be provided by displacing the material of the piston or of the ring-shaped element.

Between the lamina 513 and the house 501, there is disposed a further lamina 510, and each of the two sides of the radially extending section of the lamina 510 carries a friction lining 530,531. The lamina 510 has an I-shaped cross-sectional outline and it comprises an axially extending section 511 having teeth meshing with the teeth of the fastening section 512 of the input part. The fastening section 512 of the input part constitutes a circularly complete ring or a series of discrete radially extending flaps. When the pressure in the plenum chamber between the turbine wheel and the piston is increased, the piston and the lamina 513 are shifted in a direction toward the adjacent portion of the housing and the complementary friction surface bears upon the friction lining 531. In this manner, the friction lining 530 is urged against the friction surface of the housing and the clutch is engaged at least to the extent that it operates with slip. Starting at the housing, the transmission of torque takes place by way of the friction surface 530, the lamina 510,511, by way of teeth 518 and to the input part 503.

FIG. 9 illustrates a further embodiment of the invention wherein the friction lining carrier 550 is connected with the annular radially outer section of the piston by way of rivets located radially midway of the friction lining carrier. The friction lining carrier supports a friction lining 555. The lamina 553, which is suspended on the input part, carries a friction lining only at that side which confronts the housing and its opposite side is provided with a complementary friction surface. The radially inner portion of the piston 552 is supported by an extension 560 of the hub 561 and is centered thereon in the radial direction.

FIG. 10 illustrates a further embodiment of the invention wherein the friction lining carrier 570 is secured, i.e., fixed, to the piston 571 by welding 572 substantially radially centrally of the friction lining carrier.

FIG. 11 illustrates a further embodiment of the invention wherein the hydrodynamic torque converter 600 comprises a housing 601 consisting of two housing parts 601a and 601b which are welded to each other at 601c. The housing 601 comprises links 602 for fastening eyelets 603, the links 602 constituting radially extending lugs. Such lugs are preferably welded to the housing. The housing 601 can be rotated by a flexible sheet metal driver 605 which is affixed to eyelets by fasteners such as screws or rivets 604. The radially inner portion of the sheet metal driver is secured to the crankshaft 607 of a combustion engine by means of fasteners 606. The radially outer parts of the fastening eyelets 603 mount and are connected with a cylindrical element 608 to which is affixed a starter gear 609.

The radially inner portion of the housing 600 is connected with a centrally located stub 610. The stub is secured to the housing by welding, as at 612. This stub 610 has channels 611, 613 and 614. The channel 611 includes an axially and a radially extending component and is divided, in the central region of the stub, into the channels 614 and 613. The channel 614 comprises a radially extending component, and the channel 613 has a radially and an axially extending component. The channels 611, 614 connect a channel 616 in the transmission input shaft 615 with the plenum chamber 617 for the flow of fluid between the channels 611 and 616. The plenum chamber 617 is connected, via channels 611, 616, with a source of pressurized fluid, e.g., with a pump and valves, so that the pressurized fluid therein can act upon the piston. The fluid in the plenum chamber is a discrete body of fluid which does not form part of the circulating fluid flow within the torque converter in the toroidal path defined by the turbine wheel, pump wheel and stator wheel, and such body of fluid in the plenum chamber is also not utilized to cool the friction surfaces of the converter bypass clutch. This is due to a separation of the fluid body for circulation in the torque converter from the fluid flow for the application of pressure to the piston.

The plenum chamber 617 is bounded by the housing portion 601, the stub 610 and the piston 620, this plenum chamber extending radially between a seal 621 located radially outwardly between the housing and the piston, and a seal 622 located between the stub and the piston. When the pressure in the plenum chamber 617 is increased, pressurized fluid acts upon the piston in the axial direction and the piston engages the clutch 650. A ball 623 then seals the channel 613 so that the pressurized fluid medium cannot escape by way of the channel 613. The channel 613 is provided for the purposes of production, namely to permit the making of the channel 611 all the way to the branching off.

The converter bypass clutch 650 constitutes a disc clutch with the substantially circular ring-shaped laminae 651,652 and 653, the two axially outer laminae 651 and 652 being non-rotatably connected with the housing 601 by way of their radially outwardly located teeth 654,655 which are in form-locking engagement with the teeth 656 of the housing. The lamina 653 between the axially outer laminae is non-rotatably and form-lockingly connected to the turbine wheel at its radially inner portion by way of a connector 670. The form-locking connection between the connecting element 670 and the lamina 653 is established by means of teeth 657 in the radially inner section of the lamina and by way of teeth 671 in the connector. An axial bearing for the laminae is constituted by a split ring 659 which is installed in a circumferential groove of the housing. This is also shown in FIG. 11a.

The piston 620 comprises a force applying section 680 which acts upon the lamina 652 in response to an increase of fluid pressure. The force applying section 680 constitutes essentially a circular ring-shaped section which extends from the piston in the axial direction and is a shaped part of the piston obtained by displacement of the material of the piston. The force applying section 680 is located substantially radially centrally as seen in the radial direction of the friction linings 681,682 to thus ensure a pronouncedly homogeneous distribution of force when the laminae are being acted upon. The force applying section 680 is situated largely radially outwardly of the effective surface of the piston as a means for bounding the plenum chamber 617; in this manner, the force applying section is disposed radially outwardly of the plenum chamber 617.

The hydrodynamic torque converter 600 further comprises a turbine wheel 672, a pump wheel 677, a stator wheel 673 and the aforedescribed damper with input and output parts 674,675.

FIG. 12 illustrates a further advantageous development of the invention, the lamina 690 which is located axially between the laminae 691 and 692 having a radially inwardly located gear which is form-lockingly and non-rotatably connected with the input part 693 of the damper. The lamina 690 has radially inwardly exending arms projecting into recesses provided in the radially outer portion of the input part.

FIG. 12a illustrates a further embodiment of the novel hydrodynamic torque converter with a converter bypass clutch of the type shown in FIG. 12 except that the axially shiftable piston 699 extends radially outwardly beyond the radially outer portion of the piston shown in FIG. 12 and comprising a radially outer section provided with teeth 699a non-rotatably engaging internal teeth of the housing.

FIG. 13 illustrates an advantageous further development of the invention embodied in a hydrodynamic torque converter 700 with a housing and a turbine wheel 702, the pump wheel and the stator wheel having been omitted. The turbine wheel 702 is non-rotatably connected with the hub 703 by a connector 706, such as a rivet, the radially inner portion of the hub 703 non-rotatably receiving a transmission input shaft by means of a splined connection or a channeled gear. The piston 705 is rotatably and axially movably mounted on and is centered by the hub, a sealing element 707 in a circumferential groove 708 being located between the hub and an axially extending radially inner portion 705a of the piston. The piston 705 has a radially outer portion provided with teeth 710 which mate with an internal gear 711 of the housing 701 so that the piston 705 is non-rotatably and form-lockingly connected with the housing 701 but is shiftable relative to the housing in the axial direction. A lamina 720 having an I-shaped cross-sectional outline and a substantially ring-like configuration is provided with teeth by means of which it is suspended in the external geer 710 of the piston 705. The lamina has an axially extending first section 720 and a radially extending second section 721. The radially extending section is provided with a complementary friction surface at that side of the lamina which faces toward the housing. That side of the lamina 720 which faces away from the housing contacts a propping section 730 of the piston 705. The propping section 730 has a circular shape and is obtained as a result of deformation of the piston. A sealing element 732 in a circumferential groove of the piston radially inwardly of the propping section 730 acts as a seal between the lamina and the piston because it is installed between such parts in a stressed condition. This is also shown in FIG. 13a.

The propping section 730 is is located substantially radially midway between the marginal portions of the friction linings 741a,741b.

A clutch disc 740 with radially outwardly located friction linings 741a,741b is disposed axially between the lamina 720, such as the radial part of the lamina, and the housing. The friction linings are mounted on a friction lining carrier 742, e.g., by means of an adhesive. The radially inner portion of the friction lining carrier is connected with, e.g., riveted to, two lateral discs 743,744. The radially inner portions of the lateral discs are non-rotatably connected to and maintained at a fixed distance from each other by a rivet element 746. A flange 745, such as a circular ring-shaped element, is disposed between the lateral discs 743,744. Not only the flange but also the lateral discs have windows 747 or recesses for reception of the energy storing elements 748. These energy storing elements serve to apply a force which acts to oppose rotation of the lateral discs relative to the flange. The radially inner section of the flange 745 is provided with teeth 749 mating with the teeth 750 of the hub.

A lamina is fitted between the piston and the friction lining and is tiltably mounted, by means of teeth, on the piston. The piston force F is being applied by the piston to the lamina at a predetermined point, i.e., at a predetermined diameter of the piston or the friction lining.

At such point or at such line, which latter can be circular, the lamina can be tiltable relative to the piston. This renders it possible to compensate for changes of the angular position of the housing, of the piston and housing relative to each other or for like angular changes which are atributable, for example, to stresses due to pressure or RPM. By properly selecting the force applying point or the force applying line, as well as the thickness of the material, the extent and the progress of bias upon the friction linings, i.e., the force acting upon the friction lining as a function of the radius, can be selected in an optimum way. The means for sealing the plenum chamber axially ahead of and behind the piston comprises a sealing element, such as an O-ring. Basically, the O-ring is very close to the force applying point or the force applying line, and it is of advantage if the sealing element is disposed at that side of the force applying point which is remote from the teeth of the lamina. Since the lamina, such as a tiltable lamina, serves to transmit torque, it is connected to the piston or to the housing by teeth, lugs, bolts, leaf springs or the like.

FIGS. 14, 15, 16 and 16a illustrate additional novel further developments. The hydrodynamic torque converter 800 of FIG. 14 comprises a piston 801 which forms part of the converter bypass clutch and includes a radially outer portion provided with teeth 801a meshing with the teeth 802a of a lamina 802 to thus establish a rotation preventing connection. The lamina 802 abuts the piston 801 along an abutment circle 803 of the piston 801. In a manner as described with reference to FIG. 13, the abutment circle 803 serves as a propping location and is obtained by appropriate shaping of the material. A sealing element 804 is disposed between the abutment circle 803 and the radially inner section of the lamina 802 to serve as a means for establishing a seal in the gap between the piston 801 and the lamina 802.

The damper is designed in such a way that the piston 801 constitutes one lateral disc and the other lateral disc is arranged in a manner such that the flange is disposed between the lateral disc and the piston. Windows and/or recesses are provided in the piston, lateral disc and flange and serve to receive the energy storing elements. The flange is drivingly connected to the hub by two sets of teeth, such as internal teeth of the flange and external teeth of the hub.

The hydrodynamic torque converter 820 of FIG. 15 comprises a piston 821 which forms part of the converter bypass clutch and includes a radially outer portion provided with teeth 821a meshing with the teeth 822a of a lamina 822 to thus establish a non-rotatable connection between the lamina 822 and the piston. The lamina abuts the piston along an abutment circle 823 so that, when the piston is being acted upon by a force, the thus applied force acts upon the lamina along the abutment circle. The ring-shaped abutment serves as a contact region and is formed as a result of displacement of material in a manner hereinbefore described with reference to FIG. 13. A sealing element, which serves to seal the clearance between the piston and the lamina, is disposed in the abutment circle and the radially inner section of the lamina. The friction surface of the converter bypass clutch constitutes a conical friction surface in contrast to the flat friction disc which is shown in FIG. 14.

The hydrodynamic torque converter 840 of FIGS. 16 and 16a comprises a piston 841 which forms part of the converter bypass clutch. The radially inner portion of the piston is adjacent a friction lining carrier 542 having a friction lining 843 and being non-rotatably connected with the piston by welding at 844 or by connection including one or more rivets. The friction lining carrier contacts the piston along an abutment circle 850 of the piston so that the application of a force to the piston results in the transmission of such force to the friction lining carrier along the abutment circle 850. The abutment circle constitutes a contact region which is formed by the radially outer circular ring of the piston. Between the abutment circle 850 and the radially inner marginal portion of the friction lining carrier, there is disposed a sealing element 845 which is installed, such as received, in a recess 846 to seal the gap between the piston and the friction lining carrier. The fastening sections of the friction lining carrier constitute circumferentially aligned plane flaps by means of which the friction lining carrier and the piston are connected to each other.

FIG. 17 illustrates a further modification of a hydrodynamic torque converter 900 with a pump wheel 901 which is affixed to the housing, a turbine wheel 902 and a stator wheel 903, all received in a housing 904 consisting of two partial housings sealingly connected to each other, e.g., by welding.

The ring-shaped radially inner section 905 of the turbine wheel 902 has an I-shaped radially inner portion. In the region of the I-shaped section 905, the turbine wheel is mounted on and rotatably journalled on a stub 906 of the hub 907 and, if necessary, is centered on the stub in the radial direction. In the region 905, the turbine wheel 902 is non-rotatably connected with a disc-shaped element 908 by a securing means such as a rivet element 909 or by welding. This disc-shaped element 908 has a radially inner section provided with internal teeth 910 mating, with angular play, with an external gear 911 of the hub 907.

The radially outer portion of the turbine wheel is connected with the damper by an entraining member 912 which is non-rotatably connected to the turbine wheel, e.g., by welding. The entraining member forms part of the input section of the damper. The entraining member is further connected with a disc-shaped sheet metal element 913 by way of a connection 914 such as a rivet element or a welded joint. Each of the elements 912 and 913 constitutes a lateral disc and these discs constitute additional parts of the input section of the damper. A flange 915 which is disposed between the lateral discs of the damper is provided with windows for reception of energy storing elements 920 which are received or supported as seen in the circumferential direction. An angular displacement of the lateral discs 912, 913 relative to the flange 915 takes place in response to stressing of the energy storing elements 920 and against the restoring force of such energy storing elements which can constitute springs or elastic components. The flange 915 constitutes the output section of the damper and its radially inner portion has teeth 916 which mate, without play, with the external teeth of the hub.

The converter bypass clutch comprises a friction disc 921 which preferably carries a friction lining at each of its sides. The friction disc 921 is connected with the input part 912 of the damper by way of a form-locking connection, such as by way of external teeth 921 and the internal teeth of the element 912. The friction disc is installed axially between the generally axially fixed piston 924, which can be fixed by engaging the abutment 930, and the axially shiftable piston 923. The friction surfaces of the friction linings 922 on the friction disc can be caused to move into operative engagement with complementary friction surfaces of the pistons when the plenum chamber 925, which is formed between the piston 923 and the housing and the radially outer part of which is sealed by a sealing element 931 at the radially outer portion of the piston 923, contains a body of pressurized fluid. Thus, the damper is located radially outwardly of the plenum chamber wherein the fluid pressure can be varied to thus engage or disengage the clutch, and this damper is also located radially outwardly of the friction surfaces of the converter bypass clutch.

FIG. 18 illustrates another embodiment of a novel hydrodynamic torque converter 1000. This torque converter 1000 comprises a pump wheel 1001, a turbine wheel 1002 and a stator wheel 1003, all installed in a housing 1004. The housing 1004 preferably consists of at least two housing shells 1004a, 1004b which, by way of example, can be connected to each other by welding 1005.

The turbine wheel 1002 comprises a turbine wheel shell 1006 which carries a set of vanes 1002a. The turbine wheel 1002 further comprises a turbine wheel hub 1007. The shell 1006 and the hub 1007 are welded to each other in the region of a connection 1008, for example, by resorting to friction welding. The hub and the shell can be soldered, riveted or otherwise connected to each other. The hub 1007 consists essentially of a circular metallic ring, such as for example a sheet metal ring, having an inner diameter and an outer diameter. It is of advantage if the radially inner portion of the hub 1007 comprises a circular ring-shaped internal surface 1008 which receives an extension 1009 of an output hub 1010. The hub 1007 is rotatably mounted on the output hub 1010 and, if necessary, is journalled and/or radially centered thereon. The internal surface 1008 is preferably shaped in the axial direction or is producd in a material removing operation, such as by turning or milling. The turbine hub 1007 is received and journalled between the output hub 1010 and the hub 1011 of the stator wheel, as seen in the axial direction. That lateral surface of the hub 1007 which faces away from the pump wheel 1001 abuts a lateral surface of the output hub 1010 and the other lateral surface, which confronts the pump wheel, abuts one lateral surface of the hub of the stator wheel. If necessary, a friction or roller bearing can be installed between the pairs of confronting lateral surfaces. It will be seen that the turbine 1002 is assembled of two parts, namely of the turbine shell 1006 and the turbine hub 1007, which are connected to each other.

The output hub 1010 is provided with internal teeth 1012, such as splines, which are non-rotatably and form-lockingly connected with the external teeth 1013 of a transmission input shaft 1014. The transmission input shaft is provided with at least one axially extending bore 1015 or a channel serving to establish communication for the flow of fluid between the plenum chambers 1020 and, if necessary, 1021 and a non-illustrated fluid source with a pump and fluid flow regulating valves. This bore ensures the admission of a pressurized fluid to regulate the operation of the torque converter 1000 or of the converter bypass clutch 1099 which is provided therein.

The radially inner portion of the housing shell 1004b is connected with a stub 1022, e.g., by welding. The stub 1022 has fluid supplying bores 1023, 1023a, the bore 1023a being closed by a closing element 1023b. The stub 1022 is further provided with a cylindrical external peripheral surface 1025. The surface 1025 carries the piston 1030 of the converter bypass clutch 1099. Furthermore, the stub 1022 serves to center the torque converter 1000 in a socket 1025 of the crankshaft 1026 of the engine.

The piston 1030 of the converter bypass clutch 1099 is designed in such a way that its radially inner section includes an axially extending I-shaped annular section 1031 constituting a foot which can be formed, for example, by displacing the material of the piston. This radially inwardly located annular section 1031 has a radially inner portion receiving the stub 1022, a sealing element 1032 being provided between the foot 1031 of the piston 1030 and the stub 1022. The sealing element 1032 constitutes a sealing ring which is received in a circumferential groove of the stub. This ensures that the radially inner section of the axially shiftable piston 1030 is sealingly mounted on the input shaft of the transmission.

A median portion of the piston 1030, as seen in the radial direction, comprises a cylindrical section 1033 which extends essentially in the axial direction and is surrounded by a ring 1035 which also extends in the axial direction and is connected to the housing shell 1004b. For example, the ring 1035 can be welded to the housing shell 1004b. A sealing element 1036 is disposed between the cylindrical section 1033 of the piston 1030 and the ring 1035, for example, in a circumferentially extending groove of the piston or the ring. The circumferential groove of the piston 1030 and/or the ring 1035 can be formed by resorting to a material removing operation, e.g., by turning or milling, or by resorting to a treatment other than a material removing operation, e.g., to stamping or deep drawing.

The thus defined plenum chamber 1020 is bounded by the adjacent surface of the housing section 1004b, the piston 1030 and the stub. The plenum chamber 1020 communicates with a fluid regulating system by way of bores 1023a, 1023. By changing the pressue of fluid in the plenum chamber 1020, the axial position of the piston can be changed in a highly predictable manner to thus select the torque adapted to be transmitted by the converter bypass clutch between a minimum value of approximately 0 Nm when the clutch is disengaged and a maximum value when the clutch is fully engaged.

The converter bypass clutch consists essentially of the piston 1030 and the package of laminations 1040,1041 with two types of laminae. The laminae 1040 are not rotatable relative to the housing shell 1004b, whereas the other laminae 1041 are not turnable relative to the input part 1042 of the damper 1050.

The laminae 1040,1041 essentially constitute circular ring-shaped elements which are stacked in the axial direction in such a way that they alternate with one another. The laminae can be provided with friction linings. The radially outer portions of the laminae 1040 are provided with external teeth 1043 which mate with the internal gear 1044 of the housing shell 1004b so that they are non-rotatably and form-lockingly mounted in the housing.

The laminae 1041 are provided with internal teeth 1045 which mate with an external gear of the input section of the damper. Thus, these laminae are form-lockingly and non-rotatably connected with the input part of the damper. The input part 1042 of the damper 1099 includes a section 1064 which extends in the axial direction and can be obtained by resorting to a material displacing operation upon the essentially circular ring-shaped input part 1042 of the damper 1099. Such axially extending radially outer section of the input part is provided with external teeth which form-lockingly engage the laminae 1041. Thus, the input part of the damper constitutes a lamina carrier or is of one piece with such carrier.

It will be seen that the converter bypass clutch consists of at least two outer laminae 1040 and at least one inner lamina 1041, it being preferred to employ more than a single inner lamina 1041, for example, two inner laminae. That lamina 1040 which is adjacent the turbine 1002, as seen in the axial direction, is axially fixed by ring-shaped retainer 1047.

The radially outer portion of the piston 1030 comprises a section 1030a which is bent in the axial direction toward the turbine wheel 1002 to serve as an abutment for actuation of the converter bypass clutch 1099. Thus, the piston 1030 has a substantially s-shaped cross-sectional outline. The force applying section of the piston at the end of its axially extending section 1030a is disposed radially outwardly of the plenum chamber 1020 and axially between the plenum chamber 1020 and the turbine wheel 1002.

It is of particular advantage if the radially inner or the radially outer portion of the piston 1030 is non-rotatable but axially movable with respect to the housing shell 1004b. This can be achieved, for example, by a pair of gears in the region of the piston 1030 and stub 1022 or in the region between the piston 1030 and annular member 1035.

The input part 1042 of the damper 1050 is non-rotatably connected with the hub 1007 of the turbine wheel by means of the rivet 1051. The head of the rivet extends through an opening in the output part 1052 of the damper 1050. The input and output parts of the damper constitute substantially circular discs which can turn relative to each other against the restoring force of the energy storing elements 1053. The radially inner portion of the input part 1042 of the damper 1050 is provided with teeth mating, with angular play, with the external teeth of the output hub 1010. The radially inner portion of the output part 1052 of the damper is also provided with teeth mating with the external teeth of the output hub without any angular play.

If the converter bypass clutch and/or the turbine wheel transmits torque to the input part of the damper, such torque is being transmitted by the energy storing elements to the output part in response to angular displacement of the input and output parts relative to each other, namely from the energy storing elements to the output part and on to the output hub, as long as the input and output parts can still turn relative to each other. Once the damper ceases to damp, torque is being transmitted directly from the internal teeth of the output part to the external teeth of the output hub.

Riveting of the input part to the output part of the damper is carried out in such a way that it permits a certain angular displacement between such parts, but the input part is riveted to the hub of the turbine without any angular play.

The patent claims which were filed with the application are formulation proposals without prejudicing the attainment of broader patent protection. Applicant reserves the right to claim additional features which, heretofore, are disclosed only in the specification and/or in the drawings.

References in the dependent claims to preceding claims are indicative of further development of the subject matter of the indepedent claim by incorporation therein of the features recited in the respective dependent claims; they are not to be interpreted as a waiver of independent substantive protection for the features recited in the dependent clams referring back to preceding claims.

The subject matters of such dependent claims are to be interpreted as constituting independent inventions apart from the subject matters of the preceding dependent claims.

Furthermore, the invention is not to be limited to the embodiment(s) which is(are) specifically pointed out in the specification. On the contrary, it is possible to carry out within the framework of the invention numerous changes and modifications, especially those changes, elements and combinations and/or materials which are of an inventive nature, for example, as a result of a combination or change of individual features, elements or method steps which are being referred to in conjunction with a general description and embodiments as well as in the claims and, by resorting to combinable features, lead to a novel object or to novel method steps or series of method steps, also as concerns the manufacturing, testing and operating steps.

What is claimed is:

1. A hydrodynamic torque converter having a housing and a converter bypass clutch including a piston, a friction surface and a complimentary friction surface, wherein a substantially circular ring-shaped element is disposed between the piston and the complementary friction in the region of a housing wall and is non-rotatably connected with the piston on the one hand and, on the other hand, can be force locked by the piston in an axial direction and against the friction surface which is provided on the housing, wherein the ring-shaped element abuts the piston along an annular contact surface of the piston such that a force applied to the piston acts upon the ring-shaped element along the annular contact surface.

2. Hydrodynamic torque converter according to claim 1 with a pump wheel which is received in the housing, a turbine wheel and a stator wheel, with the piston being axially shiftable and the converter bypass clutch including a torsional vibration damper having an input part and an output part which are turnable relative to each other at least against the resistance of a restoring force furnished by energy storing elements installed between the input and output parts, as well as with a hub, wherein and the input part of the damper is connected to the hub by a connection which operates with angular play, the output part of the damper being connected with the hub by a connection which is devoid of angular play.

3. Hydrodynamic torque converter according to claim 2, wherein the hub is provided with external teeth and the input part of the damper has internal teeth mating with the external teeth of the hub with angular play to thus establish a connection exhibiting an angular play, the output part of the damper having internal teeth mating with the external teeth of the hub without angular play to thus establish a connection without angular play.

4. Hydrodynamic torque converter according to claim 1, wherein the piston is non-rotatably connected with an input part of a damper and the input part of the damper is connected to a hub by way of connection which operates with angular play, a turbine wheel being non-rotatably connected with an output part of the damper and the output part of the damper being connected to the hub by a connection which is devoid of angular play.

5. Hydrodynamic torque converter according to claim 4, wherein the hub is provided with external teeth and the input part of the damper has internal teeth mating with the external teeth of the hub with angular play to thus establish a connection exhibiting an angular play, the output part of the damper having internal teeth mating with the external teeth of the hub without angular play to thus establish a connection without angular play.

6. Hydrodynamic torque converter according to claim 2, wherein the turbine wheel comprises a radially inner ring-shaped section which is non-rotatably connected with the input or output part of the damper, and comprises a section extending in the axial direction, the hub comprising a section which extends in the axial direction and the turbine wheel being mounted on the hub by means of sections which extend in the axial direction.

7. Hydrodynamic torque converter, according to claim 6, wherein the turbine wheel is centered on the hub in radial direction.

8. Hydrodynamic torque converter, according to claim 2, wherein the damper comprises at least two disc-shaped elements which are turnable relative to each other against the restoring force of energy storing elements which are disposed between them, one of the disc-shaped elements constituting the input part of the damper and another of the disc-shaped elements constituting the output part of the damper, the disc-shaped elements being coaxial with each other and being mounted on the hub.

9. Hydrodynamic torque converter, according to claim 2, wherein the input part of the damper is connected to or of one piece with at least one element which projects in the axial direction and exends into openings of the output part.

10. Hydrodynamic torque converter, according to claim 9, wherein the movement of the at least one axially projecting element of the input part against the surfaces at the ends of the openings of the output part determines the extent of angular displacement of the input and output parts relative to each other.

11. Hydrodynamic torque converter, according to claim 9, characterized in that the extent of angular displacement of the input and output parts relative to each other as a result of movement of the at least one axially projecting element of the input part against the surfaces at the ends of the openings of the output part exceeds the extent of angular play between the input part and the hub.

12. Hydrodynamic torque converter, according to claim 9, wherein when the angular play between the input part and the hub is reduced to zero as a result of angular movement of the input part and output part relative to each other, the transmission of torque takes place from the input part to the hub until the angular displacement of the input and output parts relative to each other reaches a maximum value as a result of movement of the at least one axially projecting element of the input part against the surfaces at the ends of the openings of the output part.

13. Hydrodynamic torque converter according to claim 9, wherein the at least one axially projecting element is connected to or of one piece with the output part and extends into openings of the input part.

14. Hydrodynamic torque converter, according to claim 9, wherein the at least one axially projecting element of the input or output part is a rivet element which is form-lockingly connected with the input or output part.

15. Hydrodynamic torque converter according to claim 9, wherein the at least one axially projecting element of the input or output part is an axially projecting lug which is of one piece with the input or output part and is obtained as a result of reshaping of the material of the input or output part.

16. Hydrodynamic torque converter according to claim 14, wherein the rivet element connects the input part with the turbine wheel radially inwardly of vanes of the turbine wheel.

17. Hydrodynamic torque converter according to claim 1, wherein the piston is axially shiftable and comprises at least one element which projects in the axial direction and extends into a receptacle of the input or output part to form-lockingly connect the input or output part with the piston.

18. Hydrodynamic torque converter, according to claim 17, wherein the at least one element which projects in the axial direction is a rivet element connected with the piston or input or output part.

19. Hydrodynamic torque converter according to claim 17, wherein the at least one element which projects in the axial direction is an element made from sheet metal of the piston or the input or output part.

20. Hydrodynamic torque converter according to claim 1, wherein the piston of the converter bypass clutch includes a ring-shaped radially inner section which is axially movably mounted on a stub of a hub.

21. Hydrodynamic torque converter according to claim 1, wherein the piston of the converter bypass clutch includes a ring-shaped radially inner portion which is axially movably mounted on a transmission input shaft.

22. Hydrodynamic torque converter according to claim 21, wherein the radially inner portion of the piston is centered in the radial direction.

23. Hydrodynamic torque converter according to claim 1, wherein the torque converter bypass clutch includes at least one first friction surface and a second friction surface, wherein the first friction surface is carried by the piston and constitutes the friction surface provided on a friction lining and cooperating with a second friction surface in the region of the housing.

24. Hydrodynamic torque converter according to claim 1, wherein the friction surface is carried by the piston and cooperates with the complementary friction surface provided on a lining which is disposed in the region of the housing.

25. Hydrodynamic torque converter, according to claim 1, wherein the piston comprises at least one force transmitting section by means of which the piston can act upon the circular ring-shaped element.

26. Hydrodynamic torque converter, according to claim 1, wherein the force applying section of the piston constitutes an at least substantially circular ring-shaped section of the piston which projects in the axial direction beyond its immediate surroundings.

27. Hydrodynamic torque converter according to claim 1, wherein the force applying section of the piston constitutes an at least substantially circular ring-shaped section of the piston which can be made by material deformation and resembles a bulge which projects in the axial direction beyond its immediate surroundings.

28. Hydrodynamic torque converter according to claim 1, wherein in the region of the force transmitting section, the circular ring-shaped element is connected to the housing.

29. Hydrodynamic torque converter according to claim 1, wherein radially inwardly of the force transmitting section, the circular ring-shaped element is connected with the piston.

30. Hydrodynamic torque converter according to claim 1, wherein radially outwardly of the force transmitting section, the circular ring-shaped element is connected with the piston.

31. Hydrodynamic torque converter according to claim 29, wherein the circular ring-shaped element has an I-shaped cross-sectional outline and includes a first leg extending in the radial direction as well as a second leg extending in the axial direction.

32. Hydrokinetic torque converter according to claim 29, wherein the axially extending second leg of the circular ring-shaped element comprises a set of gear teeth which form-lockingly and non-rotatably extend in the axial direction into or through complementary gear teeth, such as receiving section.

33. Hydrodynamic torque converter, according to claim 29, wherein the circular ring-shaped element has an I-shaped cross-sectional outline and in that the form-locking connection between the axially extending leg and the piston is disposed radially inwardly of the force transmitting section of the piston.

34. Hydrodynamic torque converter, according to claim 29, wherein the circular ring-shaped element has an I-shaped cross-sectional outline and in that the form-locking connection between the axially extending leg and the piston is disposed radially outwardly of the force transmitting section of the piston.

35. Hydrodynamic torque converter, according to claim 31, wherein form-locking connection of the axially extending leg with the piston is designed only to establish a non-rotatable connection but not to transmit axial force.

36. Hydrodynamic torque converter, according to claim 1, wherein the circular ring-shaped element is a flat or conical element which carries a friction surface at the side facing away from the piston.

37. Hydrodynamic torque converter according to claim 1, wherein the circular ring-shaped element is a flat or conical element carrying a friction lining with a friction surface at the side facing away from the piston.

38. Hydrodynamic torque converter according to claim 1, further including a sealing element between the circular ring-shaped element and the piston.

39. Hydrodynamic torque converter, according to claim 38, wherein the sealing element is disposed radially inwardly of the force applying section of the piston.

40. Hydrodynamic torque converter, according to claim 38, wherein the sealing element is disposed radially outwardly of the force applying section of the piston.

41. Hydrodynamic torque converter, according to claim 38, wherein the sealing element is disposed radially between two force applying sections of the piston.

42. Hydrodynamic torque converter, according to claim 38, wherein the sealing element is received in a circumferential groove of the piston or of the circular ring-shaped element.

43. Hydrodynamic torque converter, according to claim 1, further including a lamina between the friction surface of the housing wall and the friction surface of the circular ring-shaped element, the lamina having a leg extending in a radial direction and each side of the lamina having a friction surface.

44. Hydrodynamic torque converter, according to claim 43, wherein at least one side of the radially extending leg of the lamina carries a friction lining with a friction surface.

45. Hydrodynamic torque converter according to claim 43, wherein the lamina comprises a leg which extends in an axial direction and has teeth non-rotatably mating with complementary teeth, such as a receiving portion, of the input part of the damper.

46. Hydrodynamic torque converter according to claim 43, wherein the lamina comprises a leg which extends in an axial direction and has teeth non-rotatably mating with complementary teeth, such as a receiving portion, of the turbine wheel.

47. Hydrodynamic torque converter, according to claim 1, wherein the converter bypass clutch comprises at least one friction lining having a radially inner marginal portion and a radially outer marginal portion, the force applying section of the piston being disposed substantially centrally between the two marginal portions.

48. Hydrodynamic torque converter, according to one of the preceding claim 1, wherein the converter bypass clutch comprises at least one friction lining having a radially inner marginal portion and a radially outer marginal portion, the force applying section of the piston being disposed substantially radially inwardly or radially outwardly of the middle between the two marginal portions.

49. Hydrodynamic torque converter according to claim 1, wherein the bypass clutch comprises a plenum chamber for the application of fluid pressure to the piston to thus regulate the torque which can be transmitted by the clutch, the pressure applying section of the piston being located substantially radially outwardly of the plenum chamber.

50. Hydrodynamic torque converter, according to claim 1, wherein the bypass clutch comprises a plenum chamber for the application of fluid pressure to the piston to thus regulate the torque which can be transmitted by the clutch, the pressure applying section of the piston being located substantially radially outwardly of the plenum chamber, the converter bypass clutch constituting a disc clutch having two laminae which are non-rotatably connected to the housing and a clutch disc disposed axially between the laminae, the force applying section of the piston being arranged to apply to one of the laminae a force acting in the axial direction.

51. Hydrodynamic torque converter, according to claim 50, wherein the teeth at the radially outer portions of the laminae form-lockingly and non-rotatably engage complementary teeth of the housing and the clutch disc which is disposed axially between the laminae is connected to the turbine wheel or with the input part of the damper.

52. Hydrodynamic torque converter, according to claim 50, wherein the axially movable piston has a radially inner portion mounted on and centered by a stub which is non-rotatably connected with the housing, the stub having channels serving to convey fluid or pressure medium into a plenum chamber.

53. Hydrodynamic torque converter according to claim 1, wherein the converter bypass clutch is a disc clutch with a plurality of laminae.

54. Hydrodynamic torque converter, according to claim 53, wherein the disc clutch comprises at least one inner lamina and at least two outer laminae.

55. Hydrodynamic torque converter, according to claim 1, wherein the converter bypass clutch comprises a piston including a portion having a substantially s-shaped cross-sectional outline.

56. Hydrodynamic torque converter, according to claim 2, wherein the input part of the damper is of one piece with a lamina carrier, the lamina carrier being non-rotatably connected with the inner laminae of the converter bypass clutch.

57. Hydrodynamic torque converter, according to claim 2, wherein the turbine wheel is assembled of two parts including a turbine hub and a turbine shell, the two parts being connected to each other.

\* \* \* \* \*